United States Patent
Nagao et al.

(10) Patent No.: US 12,505,328 B2
(45) Date of Patent: Dec. 23, 2025

(54) COMMUNICATION METHOD AND RADIO TAG

(71) Applicant: Socionext Inc., Kanagawa (JP)

(72) Inventors: Akifumi Nagao, Yokohama (JP); Yasutaka Uramoto, Yokohama (JP)

(73) Assignee: Socionext Inc., Kanagawa (JP)

(*) Notice: Subject to any disclaimer, the term of this patent is extended or adjusted under 35 U.S.C. 154(b) by 147 days.

(21) Appl. No.: 18/147,444

(22) Filed: Dec. 28, 2022

(65) Prior Publication Data

US 2023/0140667 A1    May 4, 2023

Related U.S. Application Data

(63) Continuation of application No. PCT/JP2021/027112, filed on Jul. 20, 2021.

(Continued)

(51) Int. Cl.
| | | |
|---|---|---|
| G08C 17/00 | (2006.01) | |
| G06K 19/07 | (2006.01) | |
| G06K 19/077 | (2006.01) | |

(52) U.S. Cl.
CPC ... G06K 19/07749 (2013.01); G06K 19/0726 (2013.01)

(58) Field of Classification Search
CPC .. G06K 19/07; G06K 19/0726; G06K 19/073; G06K 19/07749; G06K 7/0008;
(Continued)

(56) References Cited

U.S. PATENT DOCUMENTS

| | | |
|---|---|---|
| 9,740,894 B1 | 8/2017 | Kumar et al. |
| 11,734,538 B1 * | 8/2023 | Frankel ............. G06K 19/0707 340/572.1 |

(Continued)

FOREIGN PATENT DOCUMENTS

| | | |
|---|---|---|
| JP | 2004-529049 A | 9/2004 |
| JP | 2006-287559 A | 10/2006 |

(Continued)

OTHER PUBLICATIONS

International Search Report (ISR) and Written Opinion of the International Searching Authority (ISA) issued on Oct. 12, 2021 in International (PCT) Application No. PCT/JP2021/027112, with English translation.

(Continued)

*Primary Examiner* — Dionne Pendleton
(74) *Attorney, Agent, or Firm* — Rimon P.C.

(57) ABSTRACT

A communication method includes: performing carrier sensing at a predetermined time interval; transmitting first data including ID information of a current radio tag to an access point when a signal transmitted by another radio tag to the access point is not detected during the performing of the carrier sensing and the current radio tag is not in a transmission stop state; interpreting a command included in a signal, when the signal is detected during the performing of the carrier sensing and is not a signal transmitted by another radio tag to the access point, the interpreting being performed under an assumption that the signal detected is a signal transmitted from the access point; and changing the radio frequency of a signal to be transmitted by the current radio tag, when the interpreting shows that the signal includes a command instructing changing of a frequency.

9 Claims, 22 Drawing Sheets

Related U.S. Application Data

(60) Provisional application No. 63/060,942, filed on Aug. 4, 2020.

(58) Field of Classification Search
CPC .......... G06K 19/0723; G06K 19/0705; G06K 19/0707; G06K 19/0724; G06K 19/07773; G06K 7/10366; G06K 17/0029; G06K 19/0672; G06K 19/0701; G06K 19/0704; G06K 19/0708; G06K 19/0709; G06K 19/0716; G06K 19/0717; G06K 19/0718; G06K 19/0776; G06K 7/10009; G06K 7/10297; G06K 7/10306; G06K 7/10316; G06K 7/10356; G06K 7/10425; G06K 17/0025; G06K 7/0095; G06K 7/10079; G06K 19/07786; G06K 19/07796; G06K 7/10019; G06K 7/10128; G06K 7/10336; G08B 13/2405; G08B 13/2451; G08B 13/2462; G08B 13/2485; G08B 13/2402; G08B 13/2417; G08B 13/2431; G08B 13/2448; G08B 13/2454; G08B 13/2457; G08B 13/2471; G08B 13/2482; G08B 13/2488; G08B 21/0288; G08B 21/22; G08B 23/00; G08B 21/0297; G08B 26/007; G08B 3/10; H04W 24/10; H04W 4/38; H04W 4/80; H04W 52/0229; H04W 52/0235; H04W 52/0254; H04W 88/085; H04L 67/12; H04L 9/0668; H04L 9/14; H04L 27/38; H04B 1/40; H04B 17/103; H04B 17/104; H04B 17/16; H04B 17/17; H04B 17/18; H04B 17/19; H04B 17/318; H04B 5/48; H04B 5/77; H04B 5/79; H04B 1/59; H02J 2207/50; H02J 50/20; H02J 50/50; H02J 7/345; H01Q 1/2216; H01Q 1/2225; H01Q 11/08; H01Q 13/10; H01Q 15/14; H01Q 17/00; H01Q 19/108; H01Q 21/067; H01Q 21/28; H01Q 7/00; H01Q 9/0407; H01Q 9/26; H01Q 9/42; G08C 17/02; G07C 2209/64; G07C 9/28; G06Q 10/08; G06Q 10/087; G06Q 20/389; G06Q 2220/10; G06Q 30/0185; G06Q 50/265; G06F 16/2379; G06F 16/9535; G06F 21/35; G06F 21/602; G06F 21/6218; G06F 2221/2139; G06F 3/0484; G01S 5/02213; G01S 5/0226; G01S 5/02525; G01S 5/0289; G01S 5/0294; G01S 5/06; H01L 23/49855; H01L 2924/00; H01L 2924/0002; G01K 5/483; B29L 2031/3456; B29C 45/14647; B41J 29/38

See application file for complete search history.

(56) References Cited

U.S. PATENT DOCUMENTS

| | | | |
|---|---|---|---|
| 2004/0233041 | A1 | 11/2004 | Bohman et al. |
| 2007/0205896 | A1 | 9/2007 | Beber et al. |
| 2007/0296583 | A1* | 12/2007 | Rofougaran ..... G06K 19/07747 340/572.1 |
| 2008/0084310 | A1* | 4/2008 | Nikitin ............... G08B 13/2471 340/572.7 |
| 2010/0026469 | A1 | 2/2010 | Shiotsu et al. |
| 2010/0176930 | A1 | 7/2010 | Shiotsu et al. |
| 2010/0278087 | A1* | 11/2010 | Kawakami ........ H04W 52/0216 370/337 |
| 2018/0366006 | A1 | 12/2018 | Regueiro et al. |
| 2021/0020012 | A1* | 1/2021 | Shakedd .................. H04B 1/40 |
| 2021/0029567 | A1* | 1/2021 | Steigert ................ H04B 17/318 |

FOREIGN PATENT DOCUMENTS

| | | |
|---|---|---|
| JP | 2010-165191 A | 7/2010 |
| JP | 2017-224296 A | 12/2017 |
| JP | 2018-538750 A | 12/2018 |
| JP | 2010-033328 A | 2/2020 |
| WO | 2002/077882 A1 | 10/2002 |

OTHER PUBLICATIONS

Chinese Office Action dated Sep. 17, 2025 issued in the corresponding Chinese Patent Application No. 202180046456.X, with English machine translation.

* cited by examiner

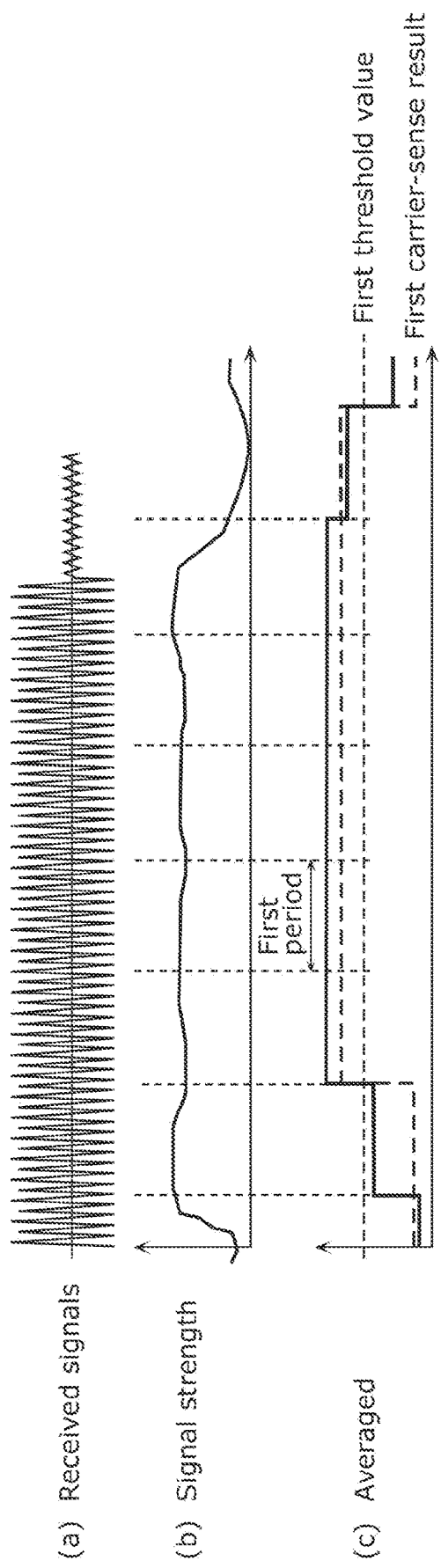

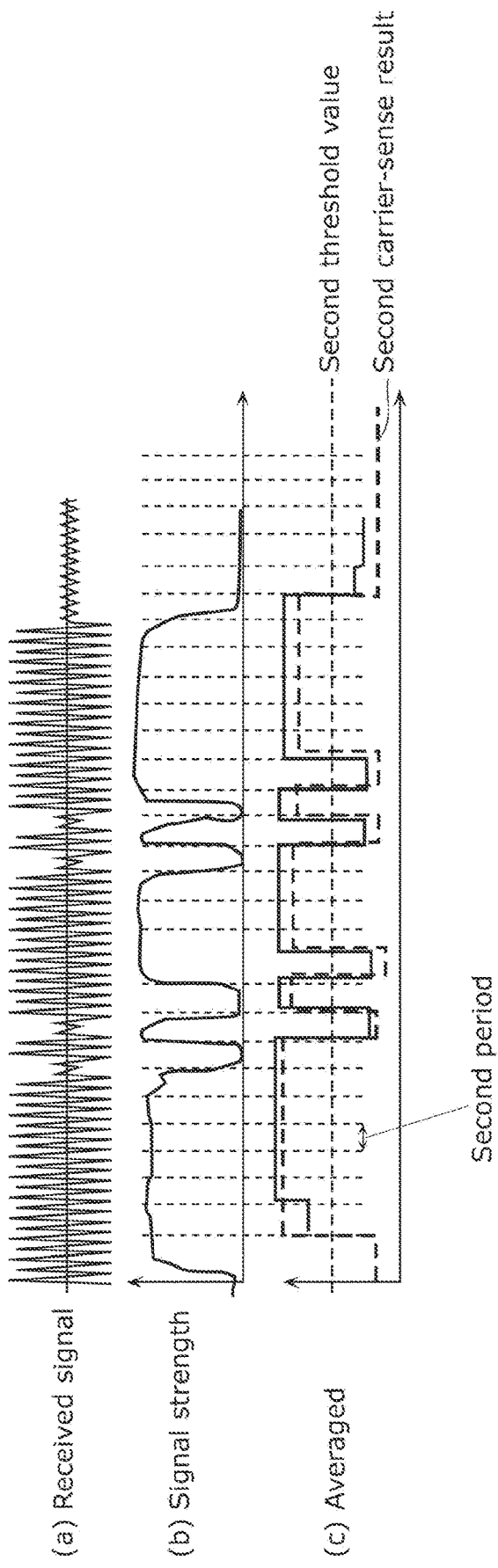

Logistics within area A

Departing from area A

FIG. 12C
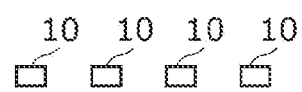
FIG. 12D
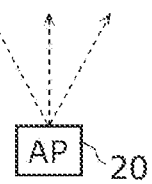

Logistics within area A

Preparing to depart from area A

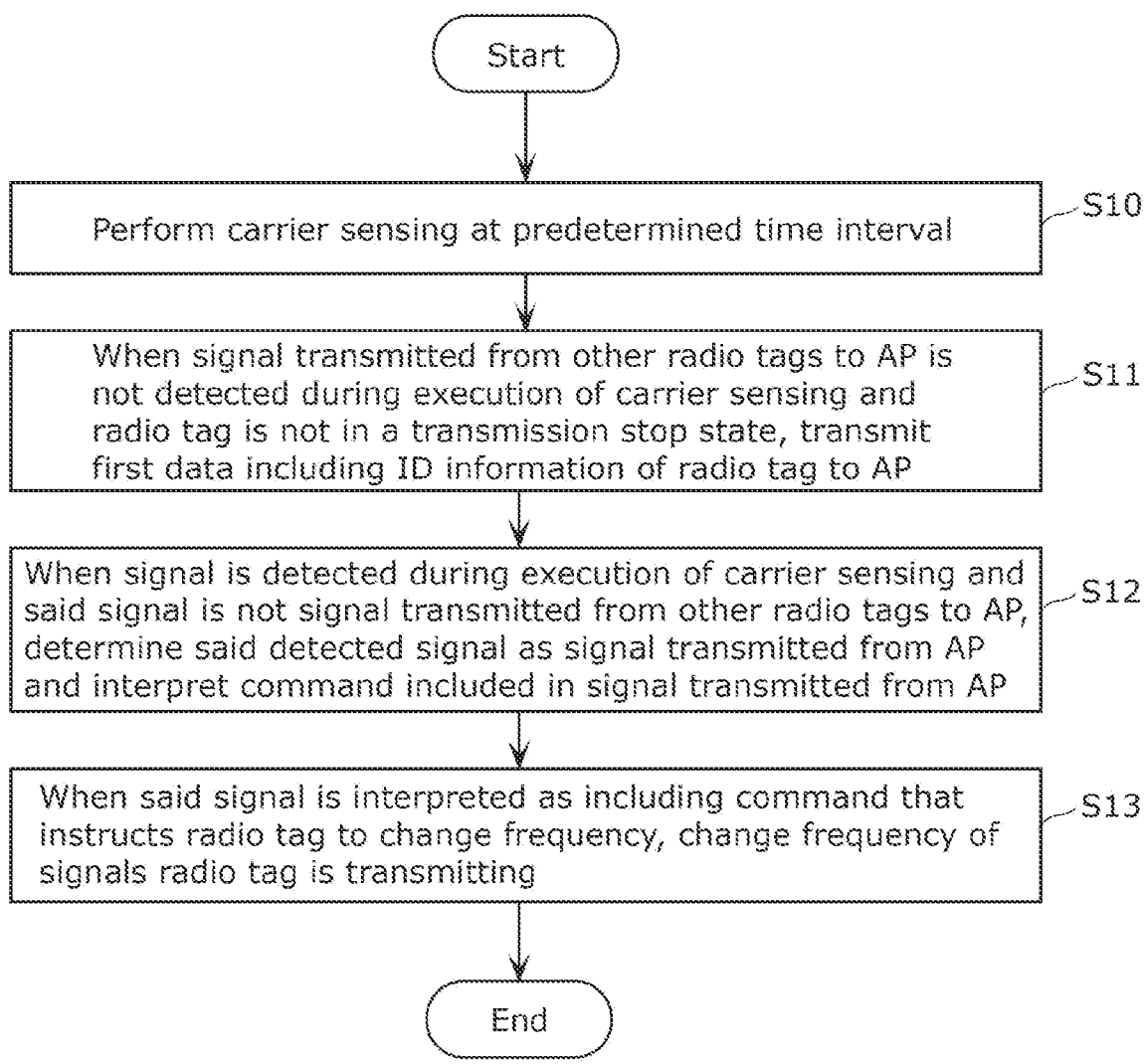

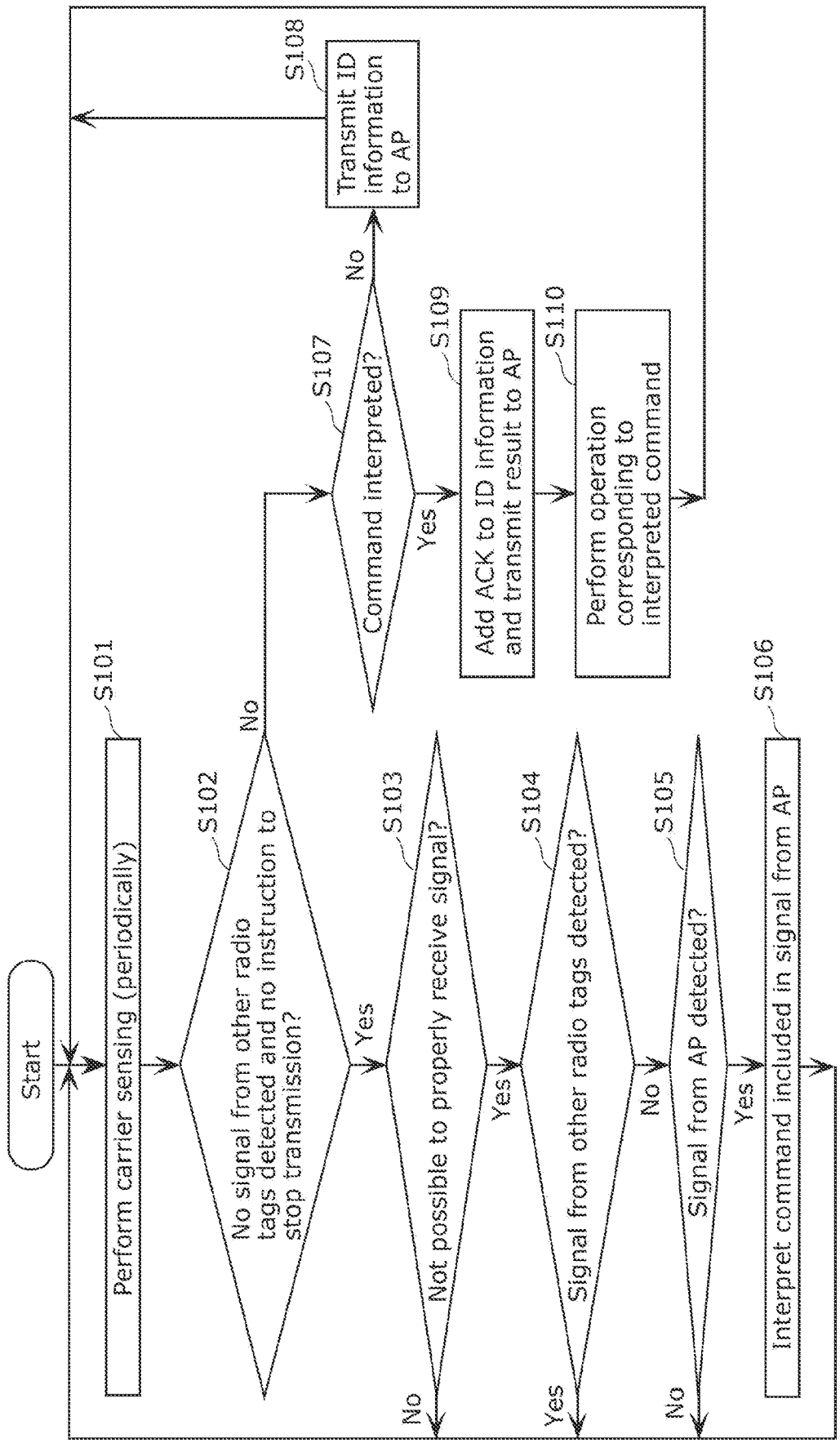

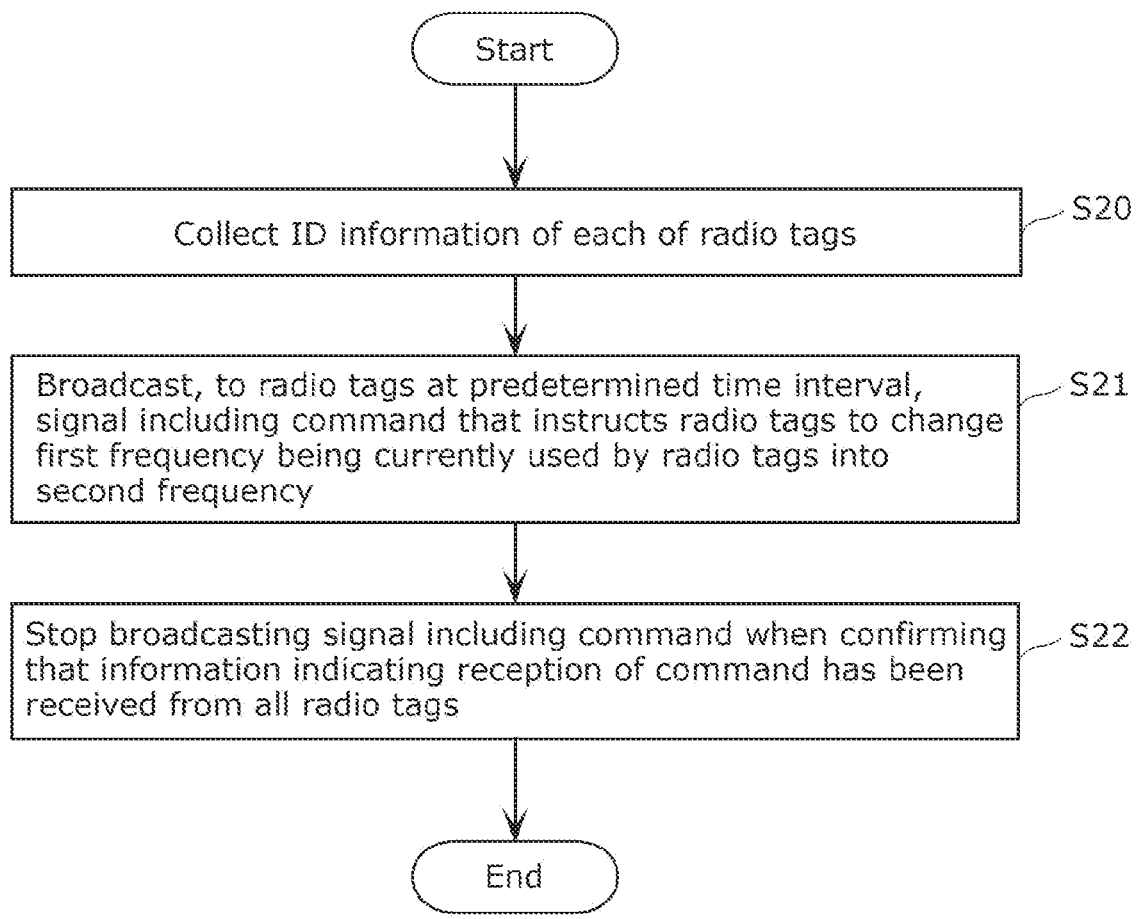

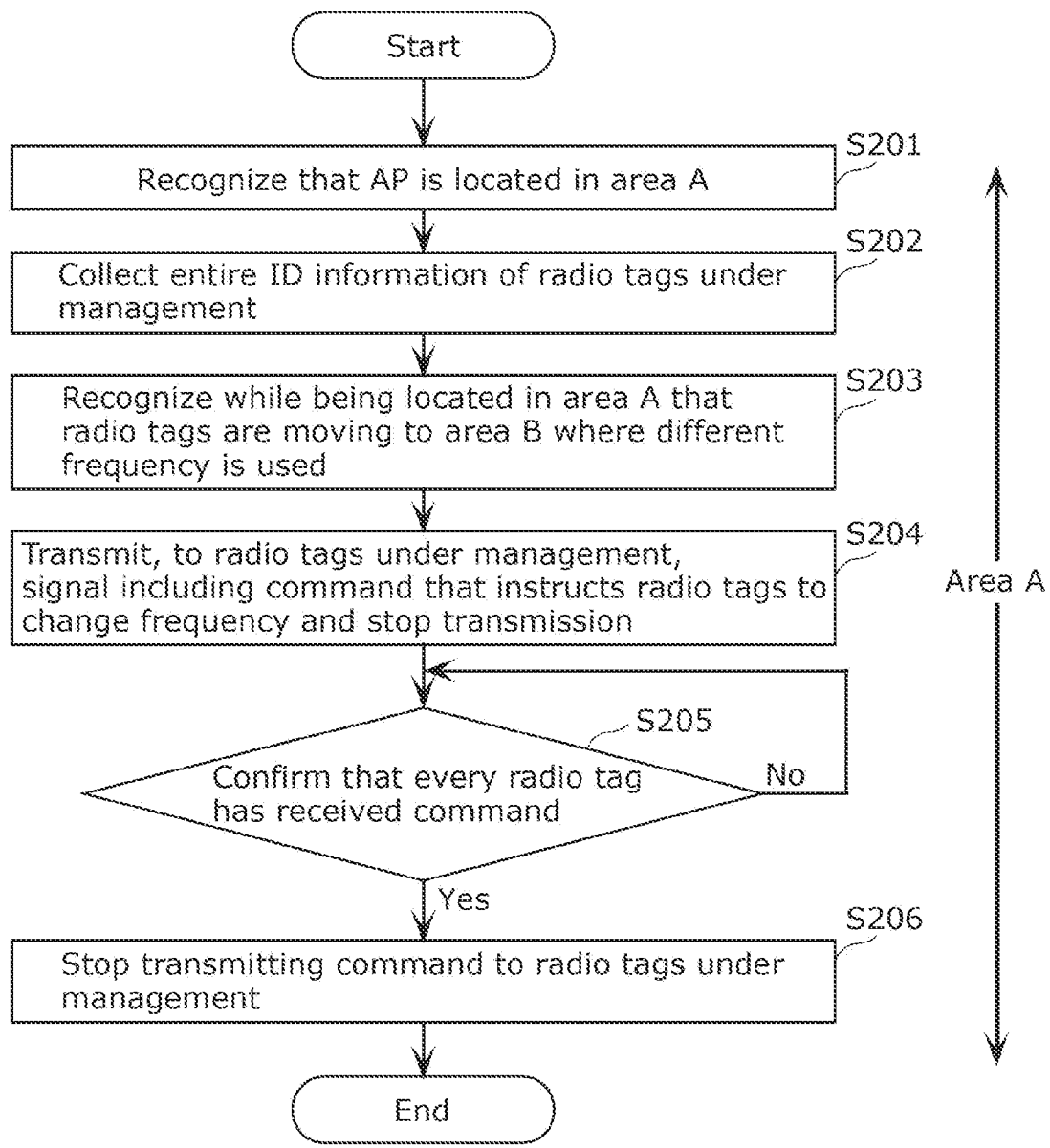

COMMUNICATION METHOD AND RADIO TAG

CROSS REFERENCE TO RELATED APPLICATIONS

This is a continuation application of PCT International Application No. PCT/JP2021/027112 filed on Jul. 20, 2021, designating the United States of America, which is based on and claims priority of U.S. Provisional Patent Application No. 63/060,942 filed on Aug. 4, 2020. The entire disclosures of the above-identified applications, including the specifications, drawings and claims are incorporated herein by reference in their entirety.

FIELD

The present disclosure relates to communication methods and radio tags, and particularly relates to a communication method performed by an active radio tag, a communication method performed by an access point that receives radio waves from an active radio tag, and an active radio tag.

BACKGROUND

Radio tags are attached to products to track the locations of the products. Note that the radio tags are also referred to as electronic tags, integrated circuit (IC) tags, radio IC tags, contactless IC tags, or radio-frequency identification (RFID) tags. The radio tags are classified as passive radio tags which are driven using electric power from external devices and emit radio waves and active radio tags which are driven using an internal battery and emit radio waves by itself.

For example, Patent Literature (PTL) 1 proposes a system capable of tracking a container by using an active radio tag. PTL 1 discloses that it is possible to provide a real-time radio tracking system in a limited area with defined borders.

CITATION LIST

Patent Literature

PTL 1: Japanese Unexamined Patent Application Publication No. 2004-529049

SUMMARY

Technical Problem

However, frequencies available for active radio tags may vary from area to area. For example, the frequency available in Japan is 920 MHz. Meanwhile, the frequency available in China is 830 MHz, and the frequency available in Europe is 868 MHz, for example. The frequency available in the United States of America is 915 MHz.

This means that it is necessary to change the frequency in the case of tracking across areas where the frequencies available for radio tags are different.

Furthermore, the acceptable cost of radio tags that are used for tracking or the like is often limited; therefore, relatively low-price radio tags without means for receiving data are used. This means that relatively low-price radio tags are problematic in that default frequencies thereof cannot be changed.

The present disclosure is conceived in view of the above-described circumstances and has an object to provide a communication method in which the frequency of an active radio tag without means for receiving data can be changed, and the radio tag.

Solution to Problem

A communication method according to one aspect of the present disclosure is performed by one radio tag included in a plurality of radio tags of a communication system including an access point and the plurality of radio tags, and includes: performing carrier sensing at a predetermined time interval; transmitting first data including ID information to the access point when a signal transmitted by a radio tag different from the one radio tag to the access point is not detected during the performing of the carrier sensing and the one radio tag is not in a transmission stop state, the ID information being information for uniquely identifying the one radio tag; interpreting a command when a signal is detected during the performing of the carrier sensing and the signal is not a signal transmitted by a radio tag different from the one radio tag to the access point, the interpreting being performed under an assumption that the signal detected is a signal transmitted from the access point, the command being included in the signal transmitted from the access point; and changing a radio frequency of a signal to be transmitted by the one radio tag, when the interpreting shows that the signal includes a command instructing changing of a frequency.

With this, it is possible to allow the active radio tag without means for receiving data to use a carrier-sense function to interpret the command transmitted by the access point and therefore, the frequency to be used by said radio tag can be changed.

For example, the transmitting may include transmitting second data to the access point when the interpreting shows that the signal includes a command instructing stopping of the transmission and changing of the frequency and when the signal transmitted by the radio tag different from the one radio tag to the access point is not detected during the performing of the carrier sensing, the second data being obtained by adding, to the first data, information indicating that the command has been received. In the changing, when the interpreting shows that the signal includes the command instructing stopping of the transmission and changing of the frequency, the radio frequency of the signal to be transmitted by the one radio tag may be changed after the second data is transmitted. The communication method may further include: controlling the one radio tag to stop only execution of the transmitting until the interpreting shows that the signal transmitted from the access point and detected during the performing of the carrier sensing includes a command instructing resuming of the transmission after the second data is transmitted in the transmitting.

Thus, it is possible to allow the radio tag to use a carrier-sense function to interpret the command transmitted by the access point and therefore, the frequency to be used by said radio tag can be changed, and signal transmission can be stopped.

Furthermore, for example, the transmitting may include transmitting second data to the access point when the interpreting shows that the signal includes a command instructing stopping of the transmission and when the signal transmitted by the radio tag different from the one radio tag to the access point is not detected during the performing of the carrier sensing, the second data being obtained by adding, to the first data, information indicating that the command has been received, and the communication method may further include: controlling the one radio tag to stop only execution of the transmitting after the second data is transmitted in the transmitting.

Thus, it is possible to allow the radio tag to use a carrier-sense function to interpret the command transmitted by the access point and therefore, signal transmission from the radio tag can be stopped.

Furthermore, for example, in the changing, when the interpreting shows that the signal includes the command instructing changing of the frequency, the radio frequency of the signal to be transmitted by the one radio tag may be changed, and the controlling may include resuming the execution of the transmitting when the radio frequency of the signal to be transmitted by the one radio tag is changed in the changing.

Thus, it is possible to allow the radio tag to use a carrier-sense function to interpret the command transmitted by the access point and therefore, the frequency to be used by said radio tag can be changed, and signal transmission that has been stopped can be resumed.

Furthermore, for example, the information indicating that the command has been received is acknowledgement (ACK).

Furthermore, for example, the performing of the carrier sensing may include: calculating a strength of a signal received during the performing of the carrier sensing; firstly determining, in a period in which a first averaged strength exceeds a first threshold value, that the signal transmitted by the radio tag different from the one radio tag to the access point is detected, the first averaged strength being obtained by averaging, in a first cycle, the strength calculated in the calculating; and secondly determining, by assessing a pattern, that a signal different from the signal transmitted by the radio tag different from the one radio tag to the access point is detected, the pattern being defined by a total number of times a second averaged strength exceeds a second threshold value and a total number of times the second averaged strength falls below the second threshold value, the second averaged strength being obtained by averaging, in a second cycle shorter than the first cycle, the strength calculated in the calculating.

Thus, using a carrier-sense function, the radio tag can simultaneously perform normal carrier sensing and carrier sensing that is used to interpret the command transmitted by the access point.

Furthermore, for example, in the performing of the carrier sensing, first carrier sensing and second carrier sensing may be performed alternately, the first carrier sensing may include: calculating a strength of a signal received during the performing of the carrier sensing; and firstly determining, in a period in which a first averaged strength exceeds a first threshold value, that the signal transmitted by the radio tag different from the one radio tag to the access point is detected, the first averaged strength being obtained by averaging, in a first cycle, the strength calculated in the calculating, and the second carrier sensing may include: calculating a strength of a signal received during the performing of the carrier sensing; and secondly determining, by assessing a pattern, that a signal different from the signal transmitted by the radio tag different from the one radio tag to the access point is detected, the pattern being defined by a total number of times a second averaged strength exceeds a second threshold value and a total number of times the second averaged strength falls below the second threshold value, the second averaged strength being obtained by averaging, in a second cycle shorter than the first cycle, the strength calculated in the calculating.

Thus, using a carrier-sense function, the radio tag can alternately perform normal carrier sensing and carrier sensing that is used to interpret the command transmitted by the access point.

Furthermore, for example, in the interpreting, the command included in the signal transmitted from the access point may be interpreted according to a combination of the total number of times the second averaged strength exceeds the second threshold value and the total number of times the second average strength falls below the second threshold value in the pattern assessed in the secondly determining.

Furthermore, a communication method according to one aspect of the present disclosure is performed by an access point of a communication system including the access point and a plurality of radio tags, and includes: collecting ID information that is information for uniquely identifying each of the plurality of radio tags; broadcasting, to the plurality of radio tags at a predetermined time interval, a signal including a command instructing changing of a first frequency being currently used by the plurality of radio tags into a second frequency; and stopping the broadcasting of the signal including the command when confirming that information indicating successful reception of the command has been received from every one of the plurality of radio tags.

Thus, the access point can send the command to the plurality of active radio tags that are being managed and are without means for receiving data, and change the frequency that is used by said radio tags.

For example, the communication method may further include: recognizing that the plurality of radio tags are to move to an area where the second frequency different from the first frequency being currently used by the plurality of radio tags needs to be used, and recognizing that the plurality of radio tags have started moving to the area; and confirming that the plurality of radio tags have entered the area. In the broadcasting, when the plurality of radio tags are recognized in the recognizing as having started moving to the area, a signal including a command that instructs changing of the first frequency being currently used by the plurality of radio tags into the second frequency and instructs stopping of the transmission may be broadcast to the plurality of radio tags at the predetermined time interval, and when the plurality of radio tags are confirmed in the confirming as having entered the area, a signal including a command instructing resuming of the transmission may be further broadcast to the plurality of radio tags at the predetermined time interval.

Furthermore, for example, the communication method may further include: recognizing that the plurality of radio tags have started moving to an area where the second frequency different from the first frequency being currently used by the plurality of radio tags needs to be used; and confirming that the plurality of radio tags have entered the area. In the broadcasting, when the plurality of radio tags are recognized in the recognizing as having started moving to the area, a signal including a command instructing stopping of the transmission may be further broadcast to the plurality of radio tags at the predetermined time interval, and when the plurality of radio tags are confirmed in the confirming as having entered the area, a signal including a command instructing changing of the first frequency being currently used by the plurality of radio tags into the second frequency may be broadcast to the plurality of radio tags at the predetermined time interval.

Furthermore, a radio tag according to one aspect of the present disclosure is one radio tag included in a plurality of radio tags of a communication system including an access point and the plurality of radio tags, and includes: a carrier-sense unit that performs carrier sensing at a predetermined time interval; an output controller that transmits first data including ID information to the access point when a signal transmitted by a radio tag different from the one radio tag to the access point is not detected during the performing of the carrier sensing and the one radio tag is not in a transmission stop state, the ID information being information for uniquely identifying the one radio tag; an interpreter that interprets a command when a signal is detected during the performing of the carrier sensing and the signal is not a signal transmitted by a radio tag different from the one radio tag to the access point, the interpreting being performed under an assumption that the signal detected is a signal transmitted from the access point, the command being included in the signal transmitted from the access point; and a frequency controller that changes a radio frequency of a signal to be transmitted by the one radio tag, when the interpreter interprets that the command includes an instruction to change a frequency.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

Advantageous Effects

With the communication method, etc., according to the present disclosure, it is possible to change the frequency of an active radio tag without means for receiving data.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8A is a diagram for describing an execution example of first carrier sensing according to an embodiment.

FIG. 8B is a diagram for describing an execution example of second carrier sensing according to an embodiment.

FIG. 12C is a diagram for describing operation of an AP and a plurality of radio tags according to CASE 1.

FIG. 12D is a diagram for describing operation of an AP and a plurality of radio tags according to CASE 1.

FIG. 14 is a flowchart illustrating the outline of operation of a radio tag according to an embodiment.

FIG. 15 is a flowchart illustrating one example of details of operation of a radio tag according to an embodiment.

FIG. 16 is a flowchart illustrating the outline of operation of an AP according to an embodiment.

FIG. 17 is a flowchart illustrating one example of details of operation of an AP according to an embodiment.

DESCRIPTION OF EMBODIMENT

Hereinafter, an embodiment of the present disclosure will be described in detail with reference to the drawings. Note that each embodiment described below shows one specific example of the present disclosure. The numerical values, shapes, materials, structural elements, the arrangement and connection of the structural elements, use procedures, communication procedures, etc., shown in the following embodiment are mere examples, and are not intended to limit the present disclosure. Among the structural elements in the following embodiment, structural elements not recited in any one of the independent claims which indicate the broadest concepts of the present disclosure will be described as arbitrary structural elements. Note that the figures are not necessarily precise illustrations. In the figures, substantially identical elements are assigned the same reference signs, and overlapping description is omitted or simplified.

EMBODIMENT

Hereinafter, a radio tag and an access point (AP) according to an embodiment will be described with reference to the drawings.

[1 Communication System]

Figure 1:
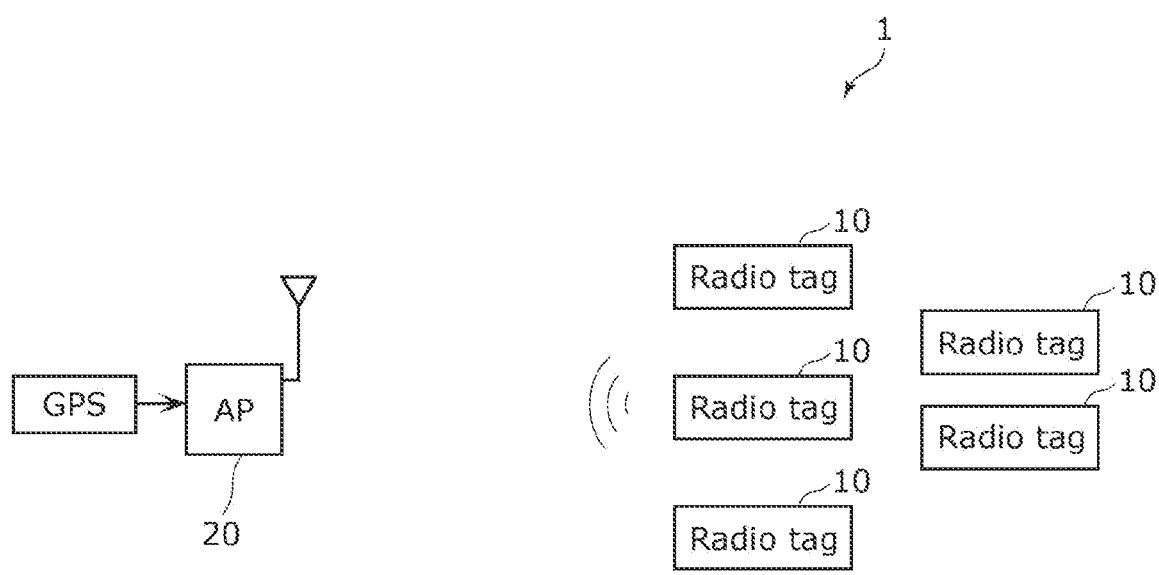
FIG. 1 is a diagram illustrating one example of the configuration of a communication system according to an embodiment.

FIG. 1 is a diagram illustrating one example of the configuration of communication system 1 according to an embodiment. As illustrated in FIG. 1, communication system 1 includes a plurality of radio tags 10 and AP 20 capable of changing a frequency that is used by the plurality of radio tags 10 under management. For example, communication system 1 can be used for a system or the like that identifies, manages, or tracks the locations of items to which radio tags 10 are assigned. Although details of radio tags 10 will be described later, radio tags 10 are active radio tags that do not have a data reception function, but have a carrier-sense function only. Although details of AP 20 will be described later, AP 20 may be configured to be able to use a global positioning system (GPS).

Hereinafter, each device will be described.

[1.2 AP 20]

Figure 2:
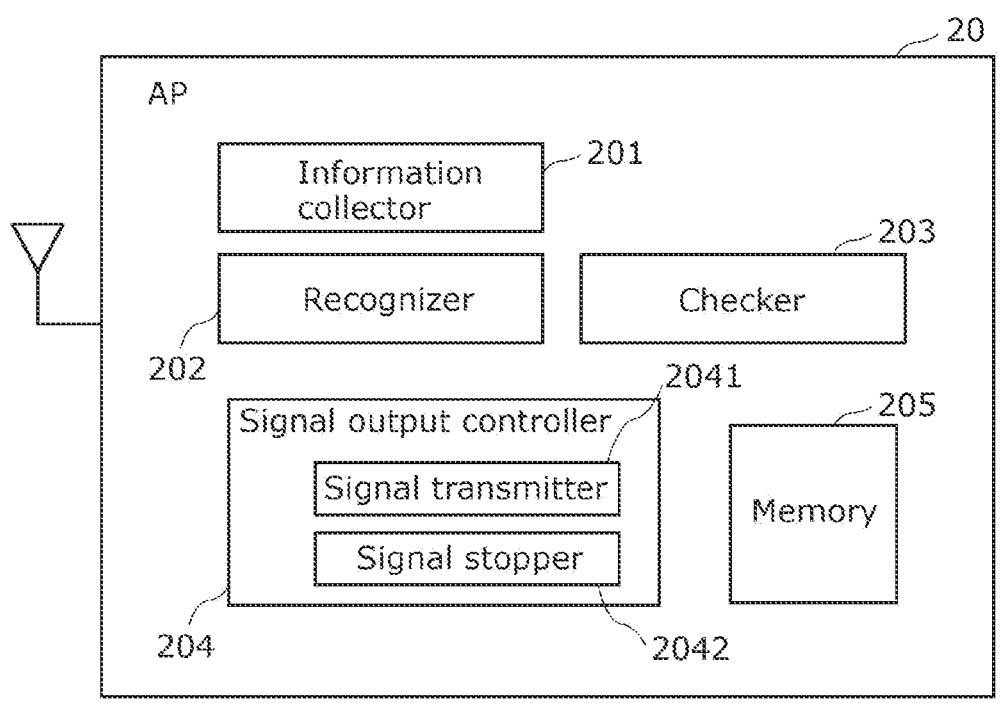
FIG. 2 is a block diagram illustrating the functional configuration of an AP according to an embodiment.

The configuration, etc., of AP 20 according to the present embodiment will be described below. FIG. 2 is a block diagram illustrating the functional configuration of AP 20 according to the embodiment.

AP 20 is a wireless base station that is provided as a computer or the like and manages the plurality of radio tags 10. AP 20 functions as an endpoint of a communication network and can be wirelessly connected to the communication network. Although AP 20 is described below as being able to use the GPS, this is not limiting; it is sufficient that an area where AP 20 is located be able to be identified via the communication network.

In the present embodiment, AP 20 includes information collector 201, recognizer 202, checker 203, signal output controller 204, and memory 205, as illustrated in FIG. 2.

Figure 3:
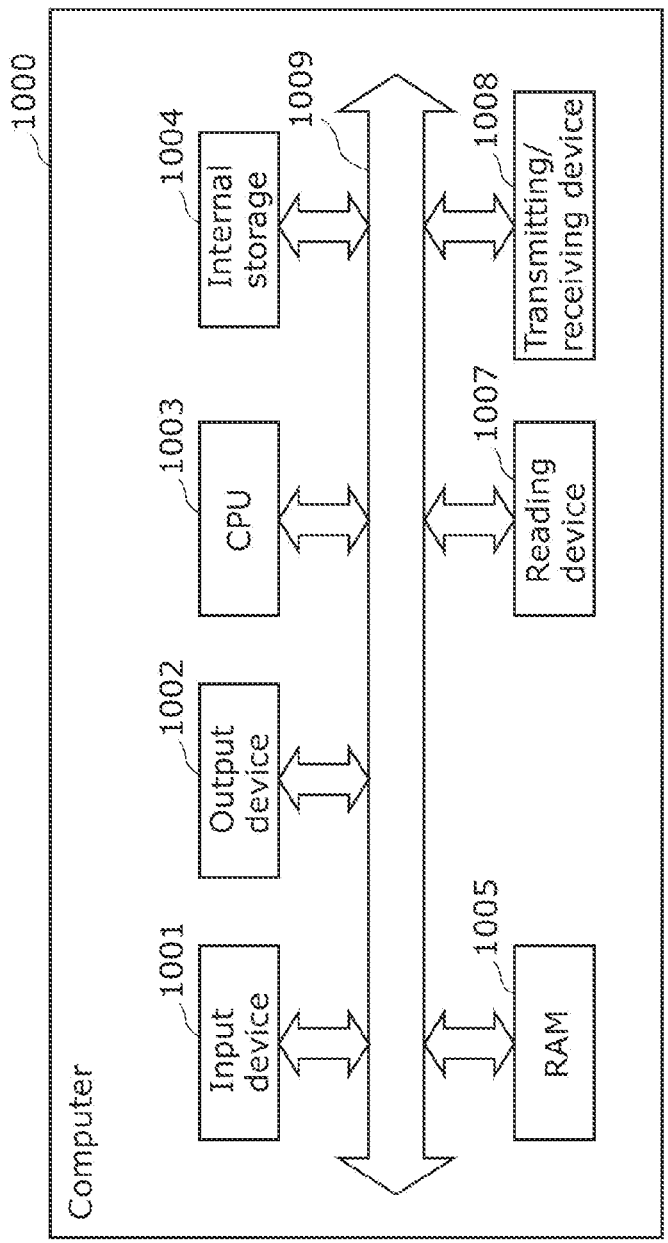
FIG. 3 is a diagram illustrating one example of the hardware configuration of a computer that implements the functions of an AP according to an embodiment through software.

With reference to FIG. 3, one example of the hardware configuration of AP 20 according to the present embodiment will be described before describing the functional configuration of AP 20 according to the present embodiment.

[1.2.1 Hardware Configuration]

FIG. 3 is a diagram illustrating one example of the hardware configuration of computer 1000 that implements the functions of AP 20 according to the embodiment through software.

Computer 1000 includes input device 1001, output device 1002, CPU 1003, internal storage 1004, random access memory (RAM) 1005, reading device 1007, transmitting/receiving device 1008, and bus 1009, as illustrated in FIG. 3. Input device 1001, output device 1002, CPU 1003, internal storage 1004, RAM 1005, reading device 1007, and transmitting/receiving device 1008 are connected using bus 1009.

Input device 1001, which serves as a user interface such as an input button, a touch pad, and a touch panel display, receives user input. Note that input device 1001 may be configured to not only receive user touch input, but also receive voice control and a remote operation using a remote control or the like.

Output device 1002, which is also used as input device 1001, includes a touch pad, a touch panel display, or the like and notifies a user of information to be delivered.

Internal storage 1004 is a flash memory or the like. At least one of a program for implementing the functions of AP 20 and an application in which the functional configuration of AP 20 is used may be stored in internal storage 1004 in advance.

RAM 1005, which is a random-access memory, is used to store data, etc., at the time of execution of the program or the application.

Reading device 1007 reads information from a recording medium such as a universal serial bus (USB) flash drive. Reading device 1007 reads the aforementioned program, application, etc., from a recording medium on which said program, application, etc., are recorded, and stores the read program, application, etc., into internal storage 1004.

Transmitting/receiving device 1008 is a communication circuit for performing wired or wireless communication. For example, transmitting/receiving device 1008 may communicate with a server device or cloud storage connected to a network, download the aforementioned program, application, etc., from the server device or the cloud storage, and store the read program, application, etc., into internal storage 1004.

CPU 1003, which is a central processing unit, copies the program, application, etc., stored in internal storage 1004 onto RAM 1005, sequentially reads commands included in said program, application, etc., from RAM 1005, and executes the read commands. Note that the commands may be executed directly from internal storage 1004.

Next, the functional configurations of AP 20 according to the present embodiment will be described.

[1.2.2 Information Collector 201]

Information collector 201 collects ID information that is information for uniquely identifying each of the plurality of radio tags 10. In the present embodiment, information collector 201 collects, via the communication network, the ID information of all the radio tags that are under the management of AP 20, and stores the ID information into memory 205. The communication network herein is, for example, cellular wireless communication network.

[1.2.3 Recognizer 202]

Recognizer 202 recognizes that the plurality of radio tags 10 have started moving to an area where a second frequency different from a first frequency being currently used by the plurality of radio tags 10 needs to be used. In the present embodiment, from the location information of the plurality of radio tags 10 that are under the management of AP 20, recognizer 202 may recognize that radio tags 10 have started moving, for example. Furthermore, recognizer 202 may obtain, via the communication network, departure-related information such as departure time obtained from the ID information of the plurality of radio tags 10 and thus recognize that the plurality of radio tags 10 have started moving.

Recognizer 202 may recognize that the plurality of radio tags 10 are to move to an area where the second frequency different from the first frequency being currently used by the plurality of radio tags 10 needs to be used. In the present embodiment, recognizer 202 may obtain area information of a destination for radio tags 10 that are under the management of AP 20 from the ID information of radio tags 10 via the communication network, for example. This allows recognizer 202 to recognize that the plurality of radio tags 10 are to move to an area where a frequency different from the frequency being currently used by the plurality of radio tags 10 is used.

[1.2.4 Checker 203]

Checker 203 confirms (recognizes) that the plurality of radio tags 10 have been placed under the management of AP 20. Furthermore, checker 203 checks (identifies), using the GPS or the like, an area where AP 20 is located. The present embodiment assumes in the following description that AP 20 accompanies the movement of the plurality of radio tags 10. Therefore, by checking the location of AP 20 using the GPS and confirming that the location of AP 20 is in said area, checker 203 can confirm that the plurality of radio tags 10 have entered said area. When AP 20 does not use the GPS and an area where AP 20 is located is identified via the communication network, the operation of checker 203 is substantially the same and thus, description thereof will be omitted.

Note that AP 20 is not limited to accompanying the movement of the plurality of radio tags 10; AP 20 does not need to accompany the movement of the plurality of radio tags 10. In this case, it is sufficient that the plurality of radio tags 10 be managed by AP 20 located in each of an area where radio tags 10 are located before the movement and an area where radio tags 10 are located after the movement.

[1.2.5 Signal Output Controller 204]

Signal output controller 204 controls output of signals (radio waves at a specific frequency). Signal output controller 204 includes signal transmitter 2041 and signal stopper 2042, as illustrated in FIG. 2, for example.

[1.2.5.1 Signal Transmitter 2041]

Signal transmitter 2041 broadcasts, to the plurality of radio tags 10 at a predetermined time interval, a signal including a command that instructs the plurality of radio tags 10 to change the first frequency being currently used by the plurality of radio tags 10 into the second frequency.

For example, assume that recognizer 202 recognizes that the plurality of radio tags 10 have started moving to said area. In this case, signal transmitter 2041 broadcasts, to the plurality of radio tags 10 at the predetermined time interval, a signal including a command that instructs the plurality of radio tags 10 to change the first frequency being currently used by the plurality of radio tags 10 into the second frequency and instructs the plurality of radio tags 10 to stop transmission.

Subsequently, when checker 203 confirms that the plurality of radio tags 10 have entered said area, signal transmitter 2041 broadcasts, to the plurality of radio tags 10 at the predetermined time interval, a signal including a command that instructs the plurality of radio tags 10 to resume the transmission.

In this manner, at a point in time when the plurality of radio tags 10 start moving (departure) to said area, signal transmitter 2041 may cause the plurality of radio tags 10 to change the frequency (radio frequency) to be used and stop transmission.

Note that when recognizer 202 recognizes that the plurality of radio tags 10 have started moving to said area, signal transmitter 2041 does not need to broadcast, to the plurality of radio tags 10, the signal including the command that instructs the plurality of radio tags 10 to change the first frequency being currently used by the plurality of radio tags 10 into the second frequency. In other words, signal transmitter 2041 may broadcast, to the plurality of radio tags 10 at the predetermined time interval, the signal including the command that instructs the plurality of radio tags 10 to stop the transmission. Subsequently, when checker 203 confirms that the plurality of radio tags 10 have entered said area, signal transmitter 2041 broadcasts, to the plurality of radio tags 10 at the predetermined time interval, the signal including the command that instructs the plurality of radio tags 10 to change the first frequency being currently used by the plurality of radio tags 10 into the second frequency.

In this manner, signal transmitter 2041 may cause the plurality of radio tags 10 to merely stop signal transmission at a point in time when the plurality of radio tags 10 start moving (departure) to said area and then, after the plurality of radio tags 10 enter said region, cause the plurality of radio tags 10 to change the frequency (radio frequency) to be used.

Figure 4:
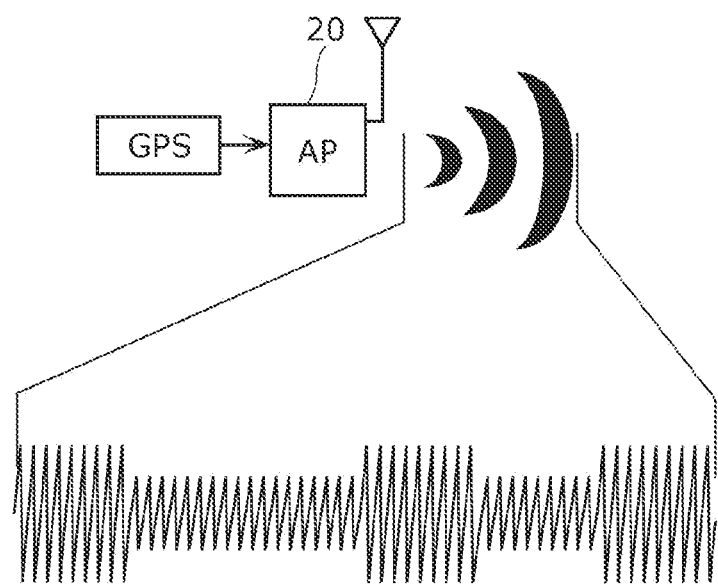
FIG. 4 is a diagram conceptually illustrating one example of a signal including a command that is broadcast from a signal transmitter according to an embodiment.

FIG. 4 is a diagram conceptually illustrating one example of the signal including the command that is broadcast from signal transmitter 2041 according to the embodiment. The signal including the command is broadcast via an antenna of AP 20.

The command that instructs the radio tags to change the frequency, the command that instructs the radio tags to stop the transmission, and the command that instructs the radio tags to resume the transmission can be included in the signal and broadcast using on-off keying (OOK) modulation in which the signal strength changes periodically, as illustrated in FIG. 4, for example.

Note that the method for including these commands into the signal is not limited to examples in the case illustrated in FIG. 4. In order to produce pattern signals corresponding to specific commands, on-off modulation in which the signal strength changes a predetermined number of times at fixed intervals so as to be less than or equal to a threshold value may be performed.

[1.2.5.2 Signal Stopper 2042]

When signal stopper 2042 confirms that information indicating successful reception of the command has been received from every one of the plurality of radio tags 10, signal stopper 2042 stops broadcasting the signal including the command.

[1.2.6 Memory 205]

Memory 205, which is one example of the recording medium, includes, for example, a rewritable non-volatile memory such as a hard disk drive or a solid-state drive. The recording medium representing memory 205 may exist in cloud storage.

[1.3 Radio Tag 10]

Figure 5:
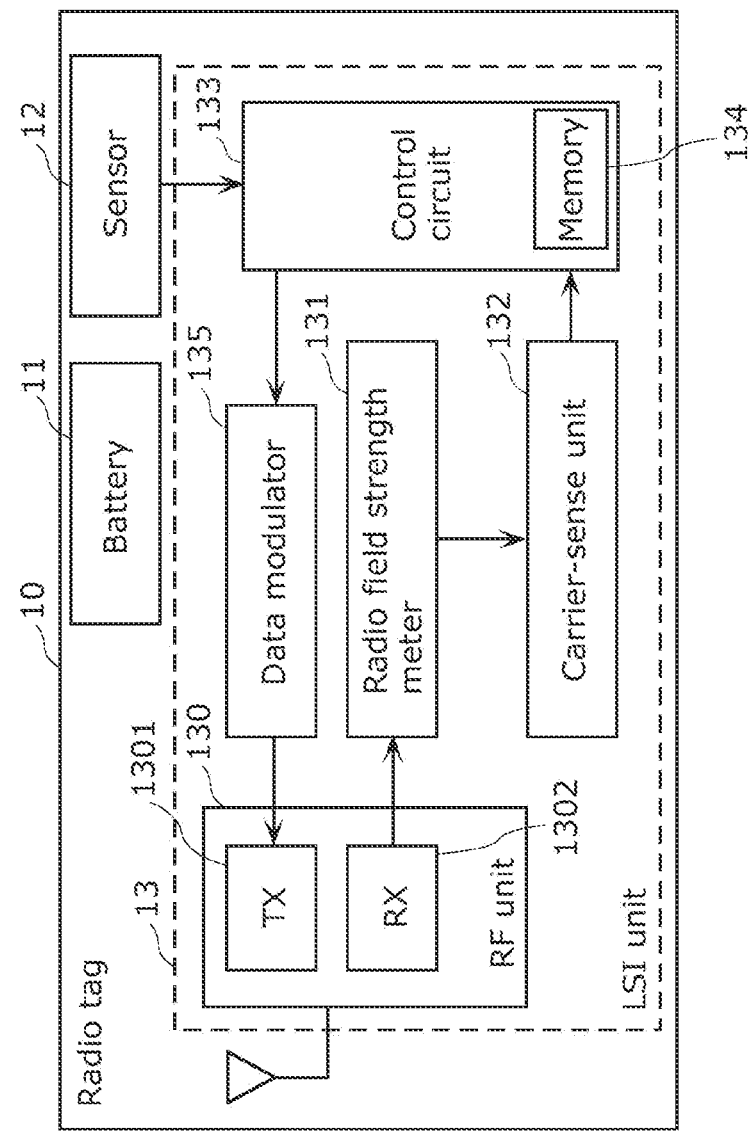
FIG. 5 is a block diagram illustrating the functional configuration of a radio tag according to an embodiment.

Next, the configuration, etc., of radio tag 10 according to the present embodiment will be described. FIG. 5 is a block diagram illustrating the functional configuration of radio tag 10 according to the embodiment.

Radio tag 10 is an active radio tag, which is driven using an internal battery and emits radio waves by itself, and does not have a data reception function, but has a carrier-sense function only. Radio tag 10 is provided (attached) or assigned to an item such as a product. In the present embodiment, radio tag 10 is capable of obtaining a signal (interpreting a command) that instructs radio tag 10 to change the frequency (radio frequency), for example, by applying the carrier-sense function. Radio tag 10 includes battery 11, sensor 12 that senses the state of the item, and a large scale integration (LSI) unit 13, as illustrated in FIG. 5.

Battery 11 is included in radio tag 10 and supplies electric power to LSI unit 13.

Sensor 12 senses the state of the item to which radio tag 10 is attached or provided, and transfers the sensing result to LSI unit 13. Note that sensor 12 is not essential.

LSI unit 13 will be described later.

[1.3.1 LSI Unit 13]

LSI unit 13 includes, for example, an IC chip that is driven by battery 11. LSI unit 13 is connected to an antenna and when radio tags 10 (hereinafter referred to as other radio tags 10) different from current radio tag 10 are not emitting radio waves (signals), emits radio waves (signals) and thus can transmit the radio waves (signals) to AP 20. LSI unit 13 is provided including a CPU, memory 134, and so on.

In the present embodiment, LSI unit 13 includes radio frequency (RF) unit 130, radio field strength meter 131, carrier-sense unit 132, control circuit 133, memory 134, and data modulator 135.

[1.3.1.1 RF Unit 130]

RF unit 130, which includes TX 1301 and RX 1302, transmits and receives signals (radio waves) via the antenna. TX 1301, which is a transmitting circuit, converts the signals modulated by data modulator 135 into radio waves in a frequency range used by radio tag 10 at the antenna, and thus transmits the signals via the radio waves. RX 1302, which is a receiving circuit, converts radio waves in the frequency range used by radio tag 10 that have been received by the antenna into signals (received signals), and transfers the received signals to radio field strength meter 131.

[1.3.1.2 Radio Field Strength Meter 131]

Radio field strength meter 131 calculates the strength of signals received during the performing of carrier sensing. In the present embodiment, radio field strength meter 131 calculates the strength of the received signals in the frequency range used by radio tag 10 that have been transferred by RF unit 130 during the performing of carrier sensing, and thus measures the strength of the radio waves received by RF unit 130. Note that radio field strength meter 131 calculates received signal strength indication (RSSI) as the strength of the received signals.

[1.3.1.3 Carrier-sense Unit 132]

Carrier-sense unit 132 performs carrier sensing at a predetermined time interval. More specifically, carrier-sense unit 132 monitors the radio field strength measured by radio field strength meter 131 during the performing of the carrier sensing, and thereby checks whether the frequency range that the current tag (radio tag 10) uses is occupied by the radio waves from other radio tags. Carrier-sense unit 132 transfers the check result to control circuit 133.

In the present embodiment, carrier-sense unit 132 monitors the strength of the received signals calculated by radio field strength meter 131 during the performing of the carrier sensing, and senses whether other radio tags 10 are transmitting signals and whether AP 20 is transmitting signals. Note that normal carrier sensing in which whether other radio tags 10 are transmitting radio waves is sensed is referred to as first carrier sensing, and carrier sensing for pattern recognition in which whether AP 20 is transmitting signals is sensed is referred to as second carrier sensing. Carrier-sense unit 132 may perform the first carrier sensing and the second carrier sensing simultaneously during the performing of the carrier sensing that is performed at the predetermined time interval or may perform the first carrier sensing and the second carrier sensing alternately during the performing of the carrier sensing that is performed at the predetermined time interval. Note that the following describes, as an example, the case where the first carrier sensing and the second carrier sensing are performed alternately.

Figure 6:
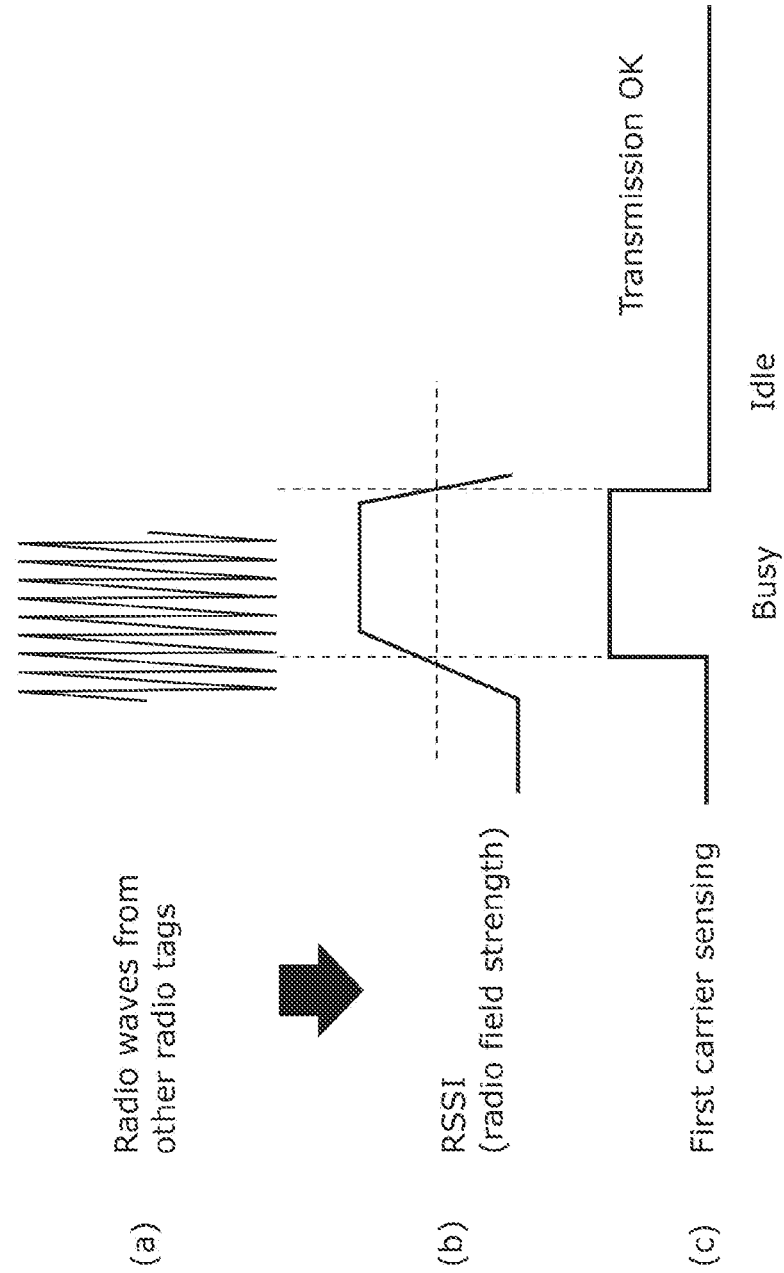
FIG. 6 is a diagram for conceptually describing execution of first carrier sensing according to an embodiment.

FIG. 6 is a diagram for conceptually describing execution of the first carrier sensing according to the embodiment. When other radio tags 10 are transmitting radio waves as illustrated in (a) in FIG. 6, radio field strength meter 131 measures a radio field strength such as that illustrated in (b) in FIG. 6. During a period in which the measured radio field strength exceeds a first threshold value as illustrated in (b) in FIG. 6, carrier-sense unit 132 detects a busy state in which other radio tags 10 are transmitting signals.

Note that during a period in which the radio field strength such as that illustrated in (b) in FIG. 6 is not measured, that is, a period in which the radio field strength measured by radio field strength meter 131 is less than or equal to the threshold value, carrier-sense unit 132 detects an idle state in which other radio tags 10 are not transmitting signals. In the idle state, radio waves in the frequency range used by radio tag 10 can be transmitted using control circuit 133, which will be described later. This means that by performing the first carrier sensing, radio tag 10 can avoid the collision of radio waves with other radio tags 10 and transmit radio waves.

Figure 7:
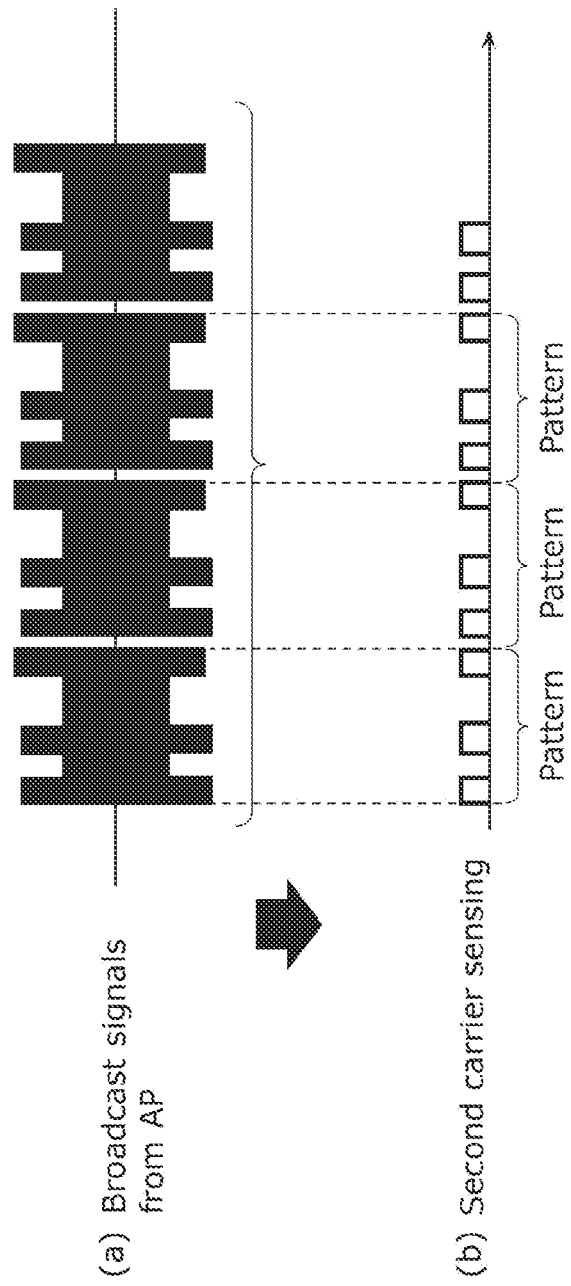
FIG. 7 is a diagram for conceptually describing execution of second carrier sensing according to an embodiment.

FIG. 7 is a diagram for conceptually describing execution of the second carrier sensing according to the embodiment. When AP 20 is broadcasting a signal including a command as illustrated in (a) in FIG. 7, radio field strength meter 131 measures a radio field strength (not illustrated in the drawings). When there is a period in which the radio field strength measured by radio field strength meter 131 exceeds a second threshold value, carrier-sense unit 132 detects a repetitive pattern in the radio field strength (a received signal strength pattern) such as that illustrated in (b) in FIG. 7. Note that the repetitive pattern can be defined by the number of periods that are in a given cycle and in which the radio field strength measured by radio field strength meter 131 is less than or equal to the second threshold value as illustrated in (b) in FIG. 7. The second threshold value may be the same as or different from the first threshold value.

Next, a specific example of the execution of the first carrier sensing will be described with reference to FIG. 8A.

FIG. 8A is a diagram for describing an execution example of the first carrier sensing according to the embodiment.

Assume that during the performing of the carrier sensing, radio field strength meter 131 receives signals such as those illustrated in (a) in FIG. 8A from RX 1302 and calculates a strength of the received signals (signal strength) such as that illustrated in (b) in FIG. 8A, for example. In this case, carrier-sense unit 132 averages the calculated strength of the received signals in a first cycle as illustrated in (c) in FIG. 8A, and determines, as a busy state, a period in which a first averaged strength obtained through the averaging exceeds the first threshold value, and determines other periods as an idle state. Subsequently, carrier-sense unit 132 transfers the determination result to control circuit 133 as a first carrier-sense result.

Next, a specific example of the execution of the second carrier sensing will be described with reference to FIG. 8B.

FIG. 8B is a diagram for describing an execution example of the second carrier sensing according to the embodiment.

Assume that during the performing of the carrier sensing, radio field strength meter 131 receives signals such as those illustrated in (a) in FIG. 8B from RX 1302 and calculates a strength of the received signals (signal strength) such as that illustrated in (b) in FIG. 8B, for example. In this case, carrier-sense unit 132 averages the calculated strength of the received signals in a second cycle shorter than the first cycle as illustrated in (c) in FIG. 8B, and assesses a pattern defined by the number of times the second averaged strength obtained through the averaging exceeds the second threshold value and the number of times the second averaged strength obtained through the averaging falls below the second threshold value (the received signal strength pattern). Subsequently, carrier-sense unit 132 transfers the determination result to control circuit 133 as a second carrier-sense result.

[1.3.1.4 Control Circuit 133]

When carrier-sense unit 132 transfers the first carrier-sense result to control circuit 133, control circuit 133 transfers the ID information of the current tag (radio tag 10) stored in memory 134 to data modulator 135. Furthermore, when carrier-sense unit 132 transfers the second carrier-sense result to control circuit 133, control circuit 133 stores the pattern (the received signal strength pattern) included in the second carrier-sense result into a partial area (pattern buffer 134a) of memory 134. When control circuit 133 successfully interprets the command using the second carrier-sense result transferred thereto, control circuit 133 adds, to the ID information of the current tag (radio tag 10) stored in memory 134, information such as acknowledgement (ACK) indicating that the command has been received, and transfers the information to data modulator 135. Control circuit 133 performs an operation corresponding to the interpreted command.

Figure 9:
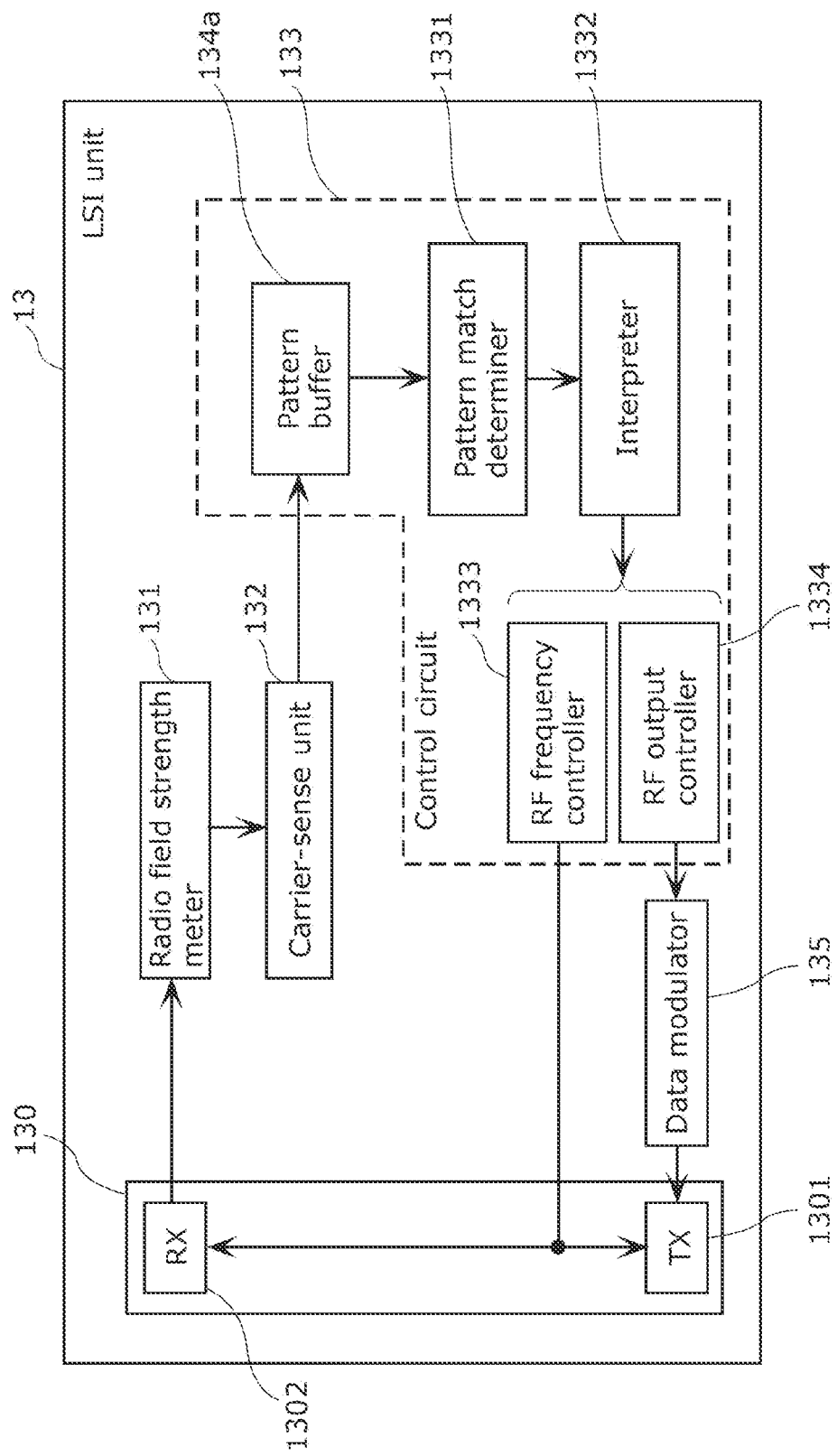
FIG. 9 is a diagram illustrating one example of a detailed function block of a control circuit included in an LSI unit illustrated in FIG. 5.

FIG. 9 is a diagram illustrating one example of a detailed function block of control circuit 133 included in LSI unit 133 illustrated in FIG. 5.

Control circuit 133 includes pattern match determiner 1331, interpreter 1332, RF frequency controller 1333, and RF output controller 1334, as illustrated in FIG. 9. Note that control circuit 133 executes the functions of pattern match determiner 1331, interpreter 1332, RF frequency controller 1333, and RF output controller 1334 using control programs stored in memory 134. Pattern match determiner 1331, interpreter 1332, RF frequency controller 1333, and RF output controller 1334 may be implemented through hardware.

[1.3.1.4.1 Pattern Match Determiner 1331]

Pattern match determiner 1331 performs matching determination on the repetitive pattern (the received signal strength pattern) included in the second carrier sensing result transferred from carrier-sense unit 132 and stored in pattern buffer 134a which is a partial area of memory 134. More specifically, pattern match determiner 1331 determines whether the repetitive pattern (the received signal strength pattern) included in the second carrier-sense result matches any of a plurality of patterns that have been set in advance.

[1.3.1.4.2 Interpreter 1332]

When a signal is detected during the performing of the carrier sensing and said signal is not the signal transmitted from other radio tags to AP 20, interpreter 1332 determines said detected signal as a signal transmitted from AP 20 and interprets a command included in the signal transmitted from AP 20. More specifically, from a combination of the number of times the second averaged strength in the repetitive pattern included in the second carrier-sense result exceeds the second threshold value and the number of times the second averaged strength in the repetitive pattern included in the second carrier-sense result falls below the second threshold value, interpreter 1332 interprets the command included in the signal transmitted from AP 20. For example, interpreter 1332 interprets the command included in the signal as a command that instructs the radio tag to stop the transmission and change the frequency or a command that instructs the radio tag to resume the transmission. Furthermore, interpreter 1332 interprets the command included in the signal as a command that instructs the radio tag to stop the transmission or a command that instructs the radio tag to change the frequency.

In the present embodiment, when the repetitive pattern (the received signal strength pattern) included in the second carrier-sense result matches any of the plurality of patterns that have been set in advance, interpreter 1332 interprets that the command corresponding to the matching pattern is the command included in the signal transmitted from AP 20.

[1.3.1.4.3 RF Frequency Controller 1333]

When interpreter 1332 interprets that the signal transmitted from AP 20 includes a command that instructs the radio tag to change the frequency, RF frequency controller 1333 changes the radio frequency of signals to be transmitted by the current radio tag (radio tag 10).

Note that when interpreter 1332 interprets that the signal transmitted from AP 20 includes a command that instructs the radio tag to stop the transmission and change the frequency, RF frequency controller 1333 changes the radio frequency of signals to be transmitted by the current radio tag after second data obtained by adding ACK to the ID information is transmitted.

Note that the ACK is one example of information indicating that the command has been received, as mentioned above.

[1.3.1.4.4 RF Output Controller 1334]

RF output controller 1334 controls output of signals to be transmitted to AP 20 and controls stoppage of signal transmission to AP 20 or resumption (start) of the signal transmission to AP 20, for example.

For example, when signals transmitted from other radio tags 10 to AP 20 are not detected during the performing of the carrier sensing and the radio tag is not instructed to stop the transmission, RF output controller 1334 transmits first data including the ID information of the current radio tag (radio tag 10) to AP 20.

Figure 10A:
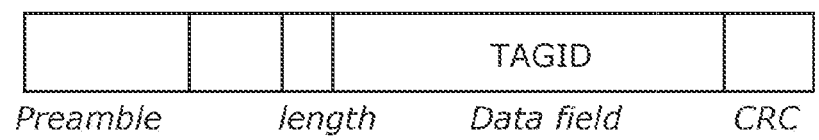
FIG. 10A is one example of first data according to an embodiment.

FIG. 10A is one example of the first data according to the embodiment. As illustrated in FIG. 10A, the first data according to the present embodiment is the ID information of radio tag 10 included in a data field.

Furthermore, for example, when interpreter 1332 interprets that the signal transmitted from AP 20 includes a command that instructs the radio tag to stop the transmission and change the frequency, and signals transmitted from other radio tags 10 to AP 20 are not detected during the performing of the carrier sensing, RF output controller 1334 may transmit, to AP 20, the second data obtained by adding the ACK to the first data. In this case, RF output controller 1334 suspends the signal transmission to AP 20 after the second data is transmitted until interpreter 1332 interprets that the signal transmitted from AP 20 and detected during the performing of the carrier sensing includes a command that instructs the radio tag to resume the transmission. Subsequently, when RF frequency controller 1333 changes the radio frequency of signals to be transmitted by the current radio tag (radio tag 10), RF output controller 1334 may resume the signal transmission to AP 20.

Figure 10B:
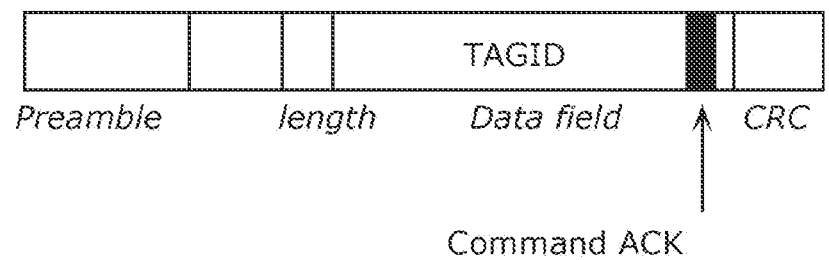
FIG. 10B is one example of second data according to an embodiment.

FIG. 10B is one example of the second data according to the embodiment. As illustrated in FIG. 10B, the second data according to the present embodiment includes the ACK in addition to the ID information (the first data) of radio tag 10 included in the data field. The ACK may be added to an empty region of the data field.

Note that, for example, when interpreter 1332 interprets that the signal transmitted from AP 20 includes a command that instructs the radio tag to stop the transmission, and signals transmitted from other radio tags 10 to AP 20 are not detected during the performing of the carrier sensing, RF output controller 1334 may transmit, to AP 20, the second data obtained by adding the ACK to the first data. In this case, after the second data is transmitted, RF output controller 1334 stops the signal transmission to AP 20.

[1.3.1.5 Memory 134]

Memory 134 is one example of the storage medium such as flash memory. Memory 134 is not limited to being disposed inside control circuit 133 as illustrated in FIG. 5, but may be disposed outside control circuit 133, but inside LSI unit 13, or may be disposed outside LSI unit 13.

In the present embodiment, memory 134 stores control programs for allowing LSI unit 13 to cause radio field strength meter 131, carrier-sense unit 132, and data modulator 135 to function. Furthermore, memory 134 stores control programs for allowing control circuit 133 to cause pattern match determiner 1331, interpreter 1332, RF frequency controller 1333, and RF output controller 1334 to function. Moreover, a partial area of memory 134 is also used as a buffer (pattern buffer 134a) by control circuit 133.

[1.3.1.6 Data Modulator 135]

Data modulator 135 performs modulation for placing data on radio waves. More specifically, data modulator 135 performs modulation for placing, on radio waves, the ID information of current radio tag 10 transmitted from control circuit 133.

[2 Operation, etc., of Communication System 1]

Next, the operation of communication system 1 including the plurality of radio tags 10 and AP 20 configured as described above will be described.

[2.1 Sequence of Operation of Communication System 1]

Before describing the sequence of operation of communication system 1 according to the present embodiment, the sequence of operation of a communication system according to a comparative example that includes radio tags 90A and 90B capable of performing normal carrier sensing (the first carrier sensing) only will be described first.

Figure 11A:
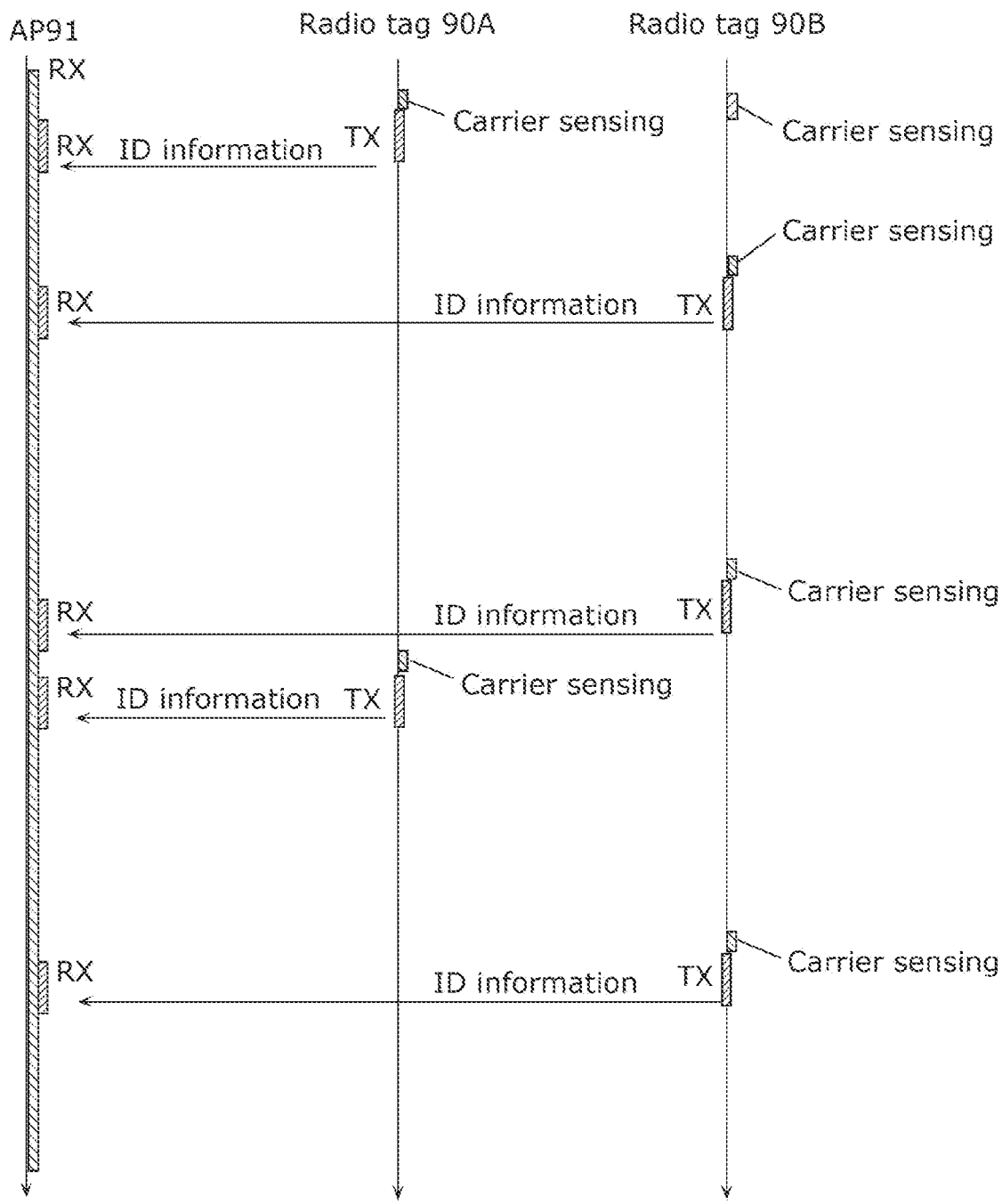
FIG. 11A is a diagram illustrating one example of a sequence of operation of a communication system according to a comparative example.

FIG. 11A is a diagram illustrating one example of the sequence of operation of the communication system according to the comparative example.

As illustrated in FIG. 11A, in the communication system according to the comparative example, each of radio tag 90A and radio tag 90B performs carrier sensing at a predetermined time interval. More specifically, radio tag 90A performs normal carrier sensing (corresponding to the first carrier sensing) at the predetermined time interval, and when radio tag 90A detects an idle state where another radio tag 90B is not transmitting radio waves, radio tag 90A transmits the ID information (corresponding to the first data) of radio tag 90A to AP 91. Similarly, radio tag 90B performs normal carrier sensing (corresponding to the first carrier sensing) at the predetermined time interval, and when radio tag 90B detects an idle state where another radio tag 90A is not transmitting radio waves, radio tag 90B transmits the ID information (corresponding to the first data) of radio tag 90B to AP 91.

Figure 11B:
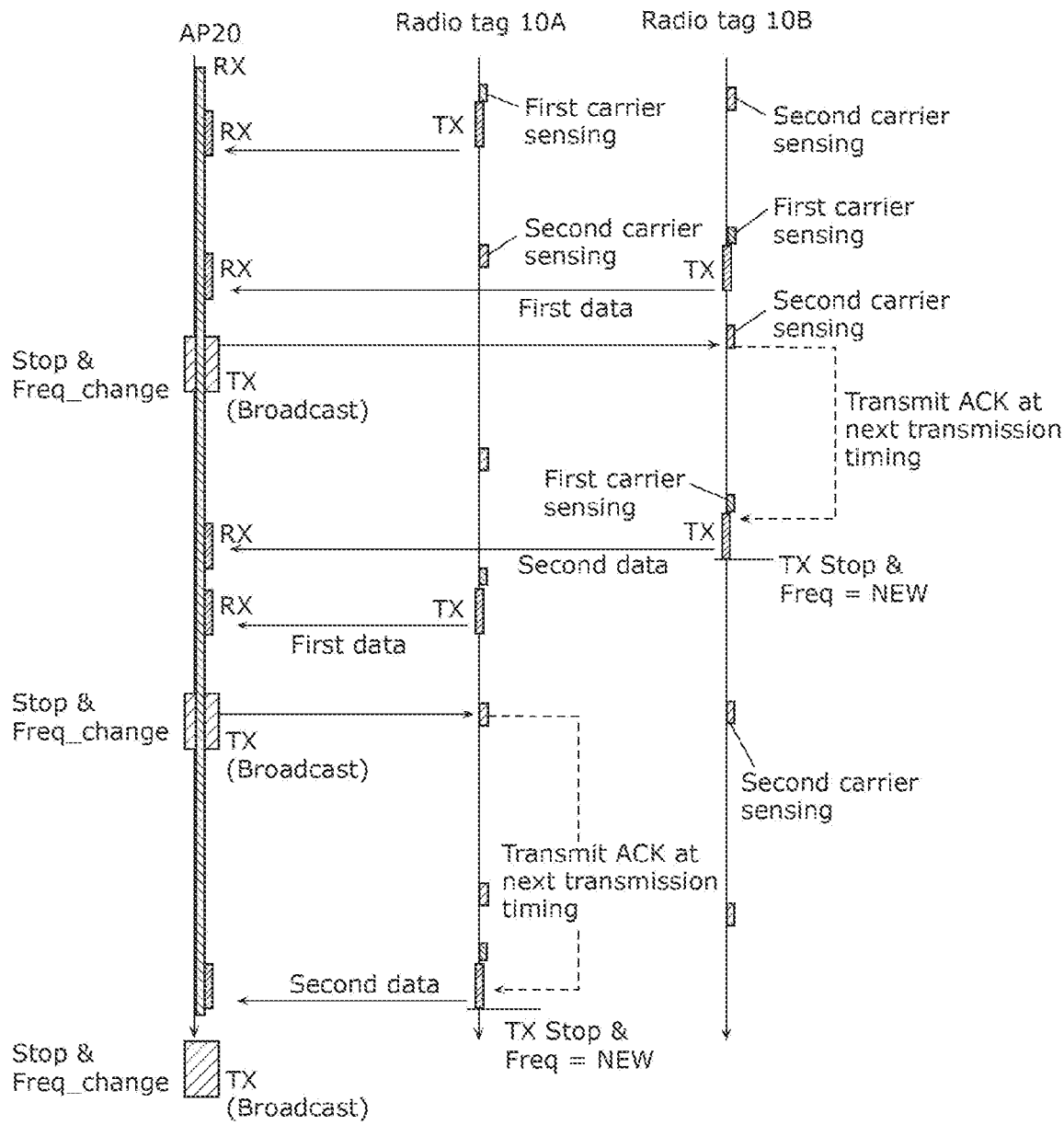
FIG. 11B is a diagram illustrating one example of a sequence of operation of a communication system according to an embodiment.

FIG. 11B is a diagram illustrating one example of the sequence of operation of communication system 1 according to the embodiment.

As illustrated in FIG. 11B, in communication system 1 according to the present embodiment, each of radio tag 10A and radio tag 10B performs normal carrier sensing and carrier sensing for pattern recognition at a predetermined time interval. More specifically, radio tags 10A and 10B alternately perform the first carrier sensing (normal carrier sensing) and the second carrier sensing (carrier sensing for pattern recognition) at the predetermined time interval. Here, assume that AP 20 is broadcasting, for a given period at a predetermined time interval, a signal including a command that instructs the radio tags to stop the transmission and change the frequency.

When radio tag 10A performs the first carrier sensing and detects an idle state where another radio tag 10B is not transmitting radio waves, radio tag 10A transmits the ID information (the first data) of radio tag 10A to AP 20. Similarly, when radio tag 10B performs the first carrier sensing and detects an idle state where another radio tag 10A is not transmitting radio waves, radio tag 10B transmits the ID information (the first data) of radio tag 10B to AP 20.

Furthermore, when radio tag 10A performs the second carrier sensing and detects a repetitive pattern (a received signal strength pattern) from the received signals, radio tag 10A interprets a command included in said signals from the repetitive pattern (the received signal strength pattern) that has been detected. When radio tag 10A successfully interprets the command included in said signals, radio tag 10A transmits, to AP 20, the second data obtained by adding the ACK to the ID information of radio tag 10A, at the next transmission timing, that is, when radio tag 10A performs the first carrier sensing and detects the idle state.

Similarly, when radio tag 10B performs the second carrier sensing and detects a repetitive pattern (a received signal strength pattern) from the received signals, radio tag 10B interprets a command included in said signals from the repetitive pattern that has been detected. When radio tag 10B successfully interprets the command included in said signals, radio tag 10B transmits, to AP 20, the second data obtained by adding the ACK to the ID information of radio tag 10B, at the next transmission timing, that is, when radio tag 10B performs the first carrier sensing and detects the idle state.

[2.2 Use Situation of Communication System 1]

Next, a use situation where communication system 1 is used in logistics will be described. A use situation where AP 20 accompanies the movement of the plurality of radio tags 10 that are under management, in other words, accompanies the movement of radio tags 10 attached to items, will be referred to as CASE 1 and described with reference to FIG. 12A to FIG. 12F.

<CASE 1>

Figure 12A:
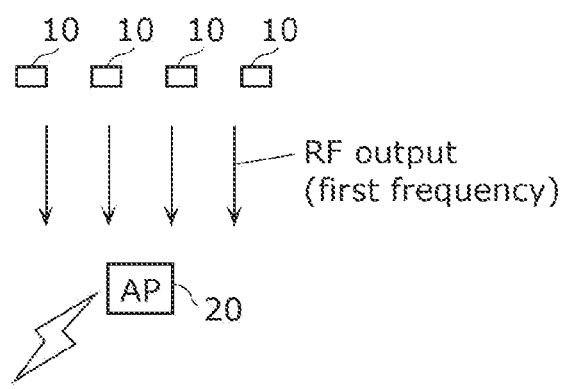
FIG. 12A is a diagram for describing operation of an AP and a plurality of radio tags according to CASE 1.
Figure 12B:
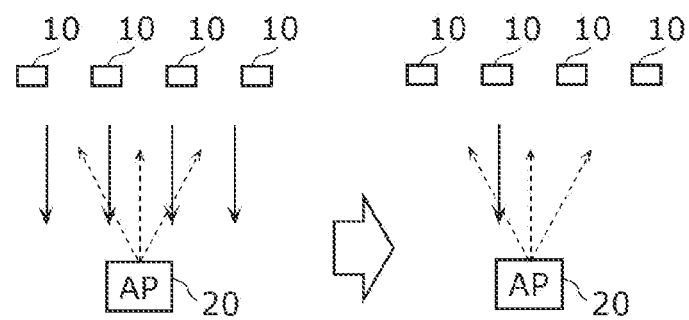
FIG. 12B is a diagram for describing operation of an AP and a plurality of radio tags according to CASE 1.

FIG. 12A to FIG. 12B are diagrams for describing the operation of AP 20 and the plurality of radio tags 10 according to CASE 1.

FIG. 12A is a diagram illustrating an operation example of AP 20 and the plurality of radio tags 10 in a situation where communication system 1 according to the present embodiment is used in logistics within area A.

As illustrated in FIG. 12A, each of the plurality of radio tags 10 performs the first carrier sensing and the second carrier sensing alternately and transmits the first data including the ID information in a given cycle (at a predetermined time interval). Here, each of the plurality of radio tags 10 is used in logistics within area A and therefore transmits signals at the radio frequency (the first frequency) used in area A.

Meanwhile, AP 20 collects and stores the ID information of the plurality of radio tags 10 that are under management. Furthermore, AP 20 is connected to a cellular wireless communication network in area A. Note that although AP 20 stores the ID information, the stored ID information may be uploaded to a specific server or cloud storage if said ID information is lost when AP 20 is powered off.

FIG. 12B and FIG. 12C are diagrams illustrating an operation example of AP 20 and the plurality of radio tags 10 in a situation where communication system 1 according to the embodiment departs from area A to another area B.

In FIG. 12B, AP 20 obtains the location information of the plurality of radio tags 10 under management or the departure-related information from the ID information of the plurality of radio tags 10 via the wireless communication network, and thus recognizes that the plurality of radio tags 10 have started moving. Here, AP 20 accesses a specific server or cloud storage via the wireless communication network and obtains information of an area (area B) that is a destination of radio tags 10 from the ID information of radio tags 10 under management, for example. Subsequently, as illustrated in FIG. 12B, AP 20 broadcasts, to the plurality of radio tags 10, a signal including a command that instructs radio tags 10 to change the first frequency into the second frequency and stop the transmission.

Meanwhile, each of the plurality of radio tags 10 performs the first carrier sensing and the second carrier sensing alternately and transmits the first data including the ID information in a given cycle (at a predetermined time interval). The plurality of radio tags 10 perform the second carrier sensing, interpret a command included in said signal, and operate according to the interpreted command. As illustrated in FIG. 12B, the plurality of radio tags 10 transmit ACKs at the next transmission timing and stop the subsequent signal transmission according to the interpreted command. Furthermore, after transmitting the ACKs, the plurality of radio tags 10 change the radio frequency to be used from the first frequency into the second frequency according to the interpreted command.

In the example illustrated in FIG. 12C, all the plurality of radio tags 10 have changed the radio frequency from the first frequency into the second frequency and stopped the signal transmission, and AP 20 has stopped the broadcasting as a result of obtaining the ACK from every one of the plurality of radio tags 10. Note that even if AP 20 fails to obtain the ACK from every one of the plurality of radio tags 10, AP 20 may stop the broadcasting when obtaining no signal from other radio tags 10 even after a predetermined period of time has elapsed since the last obtainment of the ACK from one of the plurality of radio tags 10.

FIG. 12D is a diagram illustrating an operation example of AP 20 and the plurality of radio tags 10 in a situation where communication system 1 according to the embodiment enters area B.

As illustrated in FIG. 12D, each of the plurality of radio tags 10 performs the first carrier sensing and the second carrier sensing alternately at the radio frequency (the second frequency) that is used in area B. Meanwhile, when AP 20 confirms using the GPS or the like that AP 20 itself has entered area B, AP 20 broadcasts, at the second frequency to the plurality of radio tags 10, a signal including a command that instructs the radio tags to start transmission. Note that when AP 20 is powered off after the departure from area A and the ID information stored at the time of the departure is lost, AP 20 may access the specific server or cloud storage and obtain said ID information.

Figure 12E:
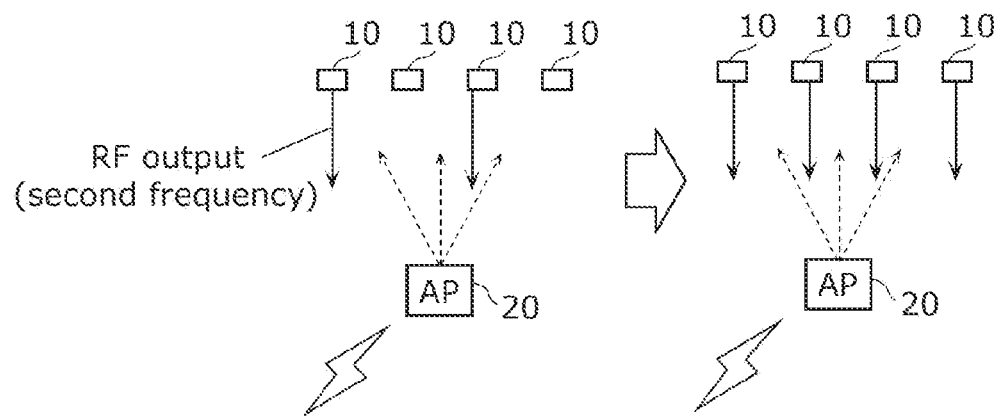
FIG. 12E is a diagram for describing operation of an AP and a plurality of radio tags according to CASE 1.
Figure 12F:
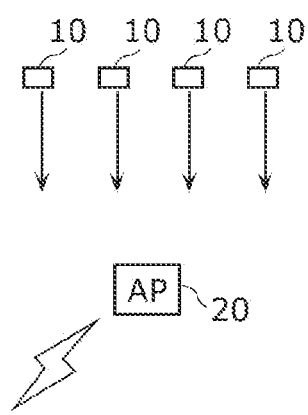
FIG. 12F is a diagram for describing operation of an AP and a plurality of radio tags according to CASE 1.

FIG. 12E and FIG. 12F are diagrams illustrating an operation example of AP 20 and the plurality of radio tags 10 in communication system 1 according to the embodiment until all of the plurality of radio tags 10 that are under the management of AP 20 start transmission in area B.

In the example illustrated in FIG. 12E, each of the plurality of radio tags 10 starts (resumes) transmission of signals of the first data according to the command interpreted by performing the second carrier sensing. Meanwhile, AP 20 continues the broadcasting until AP 20 obtains the first data from all of the plurality of radio tags 10. In contrast, in the example illustrated in FIG. 12F, AP 20 stops the broadcasting as a result of obtaining the first data from all of the plurality of radio tags 10.
<CASE 2>

In CASE 1, AP 20 is described as recognizing, at the time of departure, that the destination of the plurality of radio tags 10 under management is area B, but this is not limiting. AP 20 does not need to be able to recognize that the destination of the plurality of radio tags 10 under management is area B; a case where AP 20 cannot recognize that said destination is area B will be described as CASE 2. In other words, CASE 2 is a use situation where AP 20 accompanies the movement of the plurality of radio tags 10 that are under management, but cannot recognize that the destination of the plurality of radio tags 10 is area B. FIG. 12A to FIG. 12F will be referred to again in the following description. Operation that is substantially the same as that in CASE 1 will not be described, and only features different from CASE 1 will be described.

In the situation illustrated in FIG. 12B in CASE 2, AP 20 obtains the location information of the plurality of radio tags 10 under management or the departure-related information from the ID information of the plurality of radio tags 10 via the wireless communication network, and thus recognizes that the plurality of radio tags 10 have started moving. Note that AP 20 in CASE 2 cannot obtain information of an area (area B) that is a destination of radio tag 10. Therefore, AP 20 broadcasts, to the plurality of radio tags 10, a signal including a command that instructs the plurality of radio tags 10 to stop the transmission. Thus, AP 20 in CASE 2 does not broadcast a signal including a command that instructs the radio tags to change the first frequency into the second frequency.

Meanwhile, each of the plurality of radio tags 10 performs the first carrier sensing and the second carrier sensing alternately and transmits the first data including the ID information in a given cycle. As illustrated in FIG. 12B in CASE 2, the plurality of radio tags 10 transmit the ACK at the next transmission timing and stop the subsequent signal transmission according to the interpreted command.

In the situation illustrated in FIG. 12D in CASE 2, each of the plurality of radio tags 10 performs the first carrier sensing and the second carrier sensing alternately, not only at the first frequency, but also at a radio frequency that is used in another area B or the like. Meanwhile, when AP 20 confirms using the GPS or the like that AP 20 itself has entered area B, AP 20 broadcasts, at the second frequency to the plurality of radio tags 10, a signal including a command that instructs the radio tags to change the first frequency into the second frequency. Thus, AP 20 in CASE 2 does not broadcast a signal including a command that instructs the radio tags to start transmission.

In the situation illustrated in FIG. 12E in CASE 2, each of the plurality of radio tags 10 changes the radio frequency from the first frequency into the second frequency and starts (resumes) transmission of signals of the first data at the second frequency according to the command interpreted by performing the second carrier sensing. Meanwhile, AP 20 continues the broadcasting until AP 20 obtains the first data from all of the plurality of radio tags 10. The subsequent operation is the same as that in CASE 1 and thus, description thereof will be omitted.
<CASE 3>

In CASE 1 and CASE 2, AP 20 is described as accompanying the movement of the plurality of radio tags 10 under management, but this is not limiting. AP 20 that manages the plurality of radio tags 10 may vary from area to area. Hereinafter, a use situation for AP 20 in the area of departure in the case where AP 20 does not accompany the movement of the plurality of radio tags 10 under management and cannot recognize that the destination of the plurality of radio tags 10 is area B will be described as CASE 3.

Figure 13A:
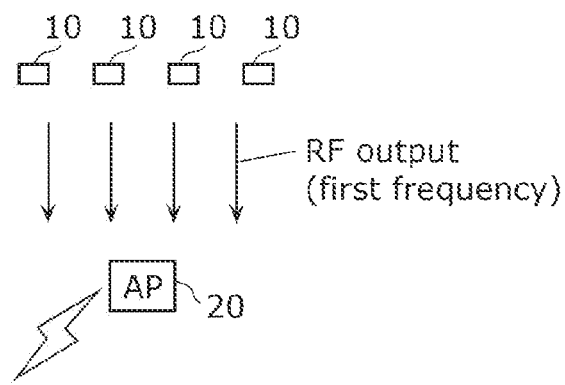
FIG. 13A is a diagram for describing operation of an AP and a plurality of radio tags according to CASE 3.
Figure 13B:
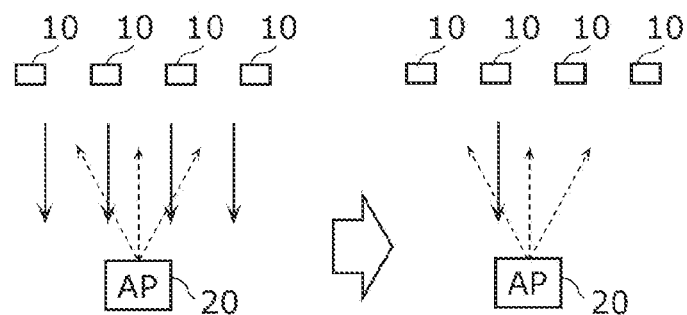
FIG. 13B is a diagram for describing operation of an AP and a plurality of radio tags according to CASE 3.

FIG. 13A and FIG. 13B are diagrams for describing the operation of AP 20 and the plurality of radio tags 10 according to CASE 3. FIG. 13A illustrates an operation example of AP 20 and the plurality of radio tags 10 in a situation where communication system 1 according to the embodiment is used in logistics within area A. Note that the operation example illustrated in FIG. 13A is as described with reference to FIG. 12A and thus, description thereof will be omitted.

FIG. 13B illustrates an operation example of AP 20 and the plurality of radio tags 10 in a situation where communication system 1 according to the embodiment prepares to depart from area A.

In FIG. 13B, AP 20 obtains an instruction indicating that the plurality of radio tags 10 are departing from area A, and thus broadcasts a signal including a command that instructs the radio tags to stop transmission. Thus, AP 20 in CASE 3 does not broadcast a signal including a command that instructs the radio tags to change the first frequency into the second frequency. Meanwhile, each of the plurality of radio tags 10 performs the first carrier sensing and the second carrier sensing alternately and transmits the first data including the ID information in a given cycle. In FIG. 13B, the plurality of radio tags 10 transmit the ACK at the next transmission timing and stop the subsequent signal transmission according to the interpreted command. The subsequent operation is substantially the same as that in CASE 2 except for the situation illustrated in FIG. 12D and thus, description thereof will be omitted.

Note that in the situation illustrated in FIG. 12D in CASE 3, each of the plurality of radio tags 10 performs only the first carrier sensing and the second carrier sensing alternately, not only at the first frequency, but also at a radio frequency that is used in another area. Meanwhile, when AP 20 in area B obtains an instruction indicating that the plurality of radio tags 10 have entered area B, AP 20 in area B accesses a specific server or cloud storage and obtains the ID information. Subsequently, AP 20 in area B broadcasts, at the second frequency to the plurality of radio tags 10, a signal including a command that instructs the radio tags to change the first frequency into the second frequency. Thus, AP 20 in area B in CASE 3 does not broadcast a signal including a command that instructs the radio tags to start transmission.

[2.3 Operation of Radio Tag 10]

Next, the operation of radio tag 10 according to the present embodiment will be described.

FIG. 14 is a flowchart illustrating the outline of operation of radio tag 10 according to the embodiment.

First, radio tag 10 performs carrier sensing at a predetermined time interval (S10).

Next, when a signal transmitted from other radio tags 10 to AP 20 is not detected during the performing of the carrier sensing and radio tag 10 is not in a transmission stop state, radio tag 10 transmits the first data including the ID information of the current radio tag (radio tag 10) to AP 20 (S11).

Next, a signal is detected during the performing of the carrier sensing and said signal is not the signal transmitted from other radio tags to AP 20, radio tag 10 determines said detected signal as a signal transmitted from AP 20 and interprets a command included in the signal transmitted from AP 20 (S12).

Next, when said signal is interpreted as including a command that instructs the radio tag to change the frequency, radio tag 10 changes the radio frequency of signals to be transmitted by the current radio tag (radio tag 10) (S13).

FIG. 15 is a flowchart illustrating one example of details of the operation of radio tag 10 according to the embodiment.

First, radio tag 10 performs carrier sensing periodically (at a predetermined time interval) (S101). For example, radio tag 10 periodically performs the first carrier sensing and the second carrier sensing in an alternate manner, but may perform the first carrier sensing and the second carrier sensing at the same time.

Next, radio tag 10 checks whether no signal from other radio tags 10 has been detected during the performing of the carrier sensing and an instruction to stop transmission has not been received (S102).

When a signal from other radio tags 10 has been detected or a stop signal has been received in Step S102 (Yes in Step S102), radio tag 10 checks whether it is not possible to properly receive the detected signal (S103).

When it is possible to properly receive the detected signal in Step S103 (Yes in Step S103), radio tag 10 checks whether the signal from another radio tag 10 has been detected (S104). Note that a situation where radio tag 10 cannot properly receive the detected signal (No in Step S103) is a situation where the signals from other radio tags 10 overlap each other or a situation where the signal from other radio tags 10 and the signal from AP 20 overlap each other.

When the signal from other radio tags 10 has not been detected in Step S104 (No in Step S104), radio tag 10 determines that the signal from AP 20 has been detected (Yes in S105) and interprets a command included in the signal from AP 20 (S106). When radio tag 10 interprets the command included in the signal from AP 20, it is sufficient that radio tag 10 change, for example, the state of command reception (ACK) held in the internal memory (memory 134) into a state indicating that the command from the AP has been received. Examples of the command included in the signal from AP 20 include a command that instructs the current radio tag (radio tag 10) to stop signal transmission (disable the transmission) and a command that instructs the current radio tag (radio tag 10) to change the radio frequency being currently used by the radio tag into a specific radio frequency.

Note that the process in Step S105 may be skipped. When the result in Step S103 is No, when the result in Step S104 is Yes, and when the result in Step S105 is No, the processing returns to Step S101.

When no signal from other radio tags 10 has been detected and the stop signal has not been received in Step S102 (No in Step S102), radio tag 10 checks whether the command has been interpreted in the last execution of the carrier sensing (the second carrier sensing) (S107).

When it is determined in S107 that the command has not been interpreted in the last execution of the second carrier sensing (No in Step S107), radio tag 10 transmits the ID information to AP 20 (S108).

When it is determined in Step S107 that the command has been interpreted in the last execution of the second carrier sensing (Yes in Step S107), radio tag 10 adds the ACK to the ID information and transmits the ID information with the ACK to AP 20 (S109).

Next, radio tag 10 performs an operation corresponding to the command interpreted in the last execution of the second carrier sensing (S110). After performing the operation, radio tag 10 returns to Step S101.

In Step S110, for example, when the command included in the signal from AP 20 is a command that instructs the current radio tag (radio tag 10) to stop signal transmission (disable transmission), radio tag 10 stops the subsequent signal transmission after transmitting the ACK to AP 20. Subsequently, it is sufficient that radio tag 10 change, for example, the state of transmission availability (TxStop) held in the internal memory (memory 134) into a state indicating that the signal transmission from the current radio tag (radio tag 10) has been stopped.

Furthermore, in Step S110, for example, when the command included in the signal from AP 20 is a command that instructs the current radio tag (radio tag 10) to change the radio frequency being currently used by the radio tag into a specific radio frequency, radio tag 10 changes the radio frequency being currently used by the radio tag into the specific radio frequency after transmitting the ACK to AP 20. Subsequently, it is sufficient that radio tag 10 change, for example, the state of frequency selection (Freq) held in the internal memory (memory 134) into a state indicating that the specific radio frequency has been selected.

[2.4 Operation of AP 20]

Next, the operation of AP 20 according to the present embodiment will be described.

FIG. 16 is a flowchart illustrating the outline of operation of AP 20 according to the embodiment.

First, AP 20 collects the ID information of each of the plurality of radio tags 10 (S20). More specifically, AP 20 collects ID information that is information for uniquely identifying each of the plurality of radio tags 10 under management.

Next, AP 20 broadcasts, to the plurality of radio tags 10 at a predetermined time interval, a signal including a command that instructs the plurality of radio tags 10 to change the first frequency being currently used by the plurality of radio tags 10 into the second frequency (S21).

Next, when AP 20 confirms that all of the plurality of radio tags 10 have received said command, AP 20 stops broadcasting the signal including said command (S22).

Figure 18:
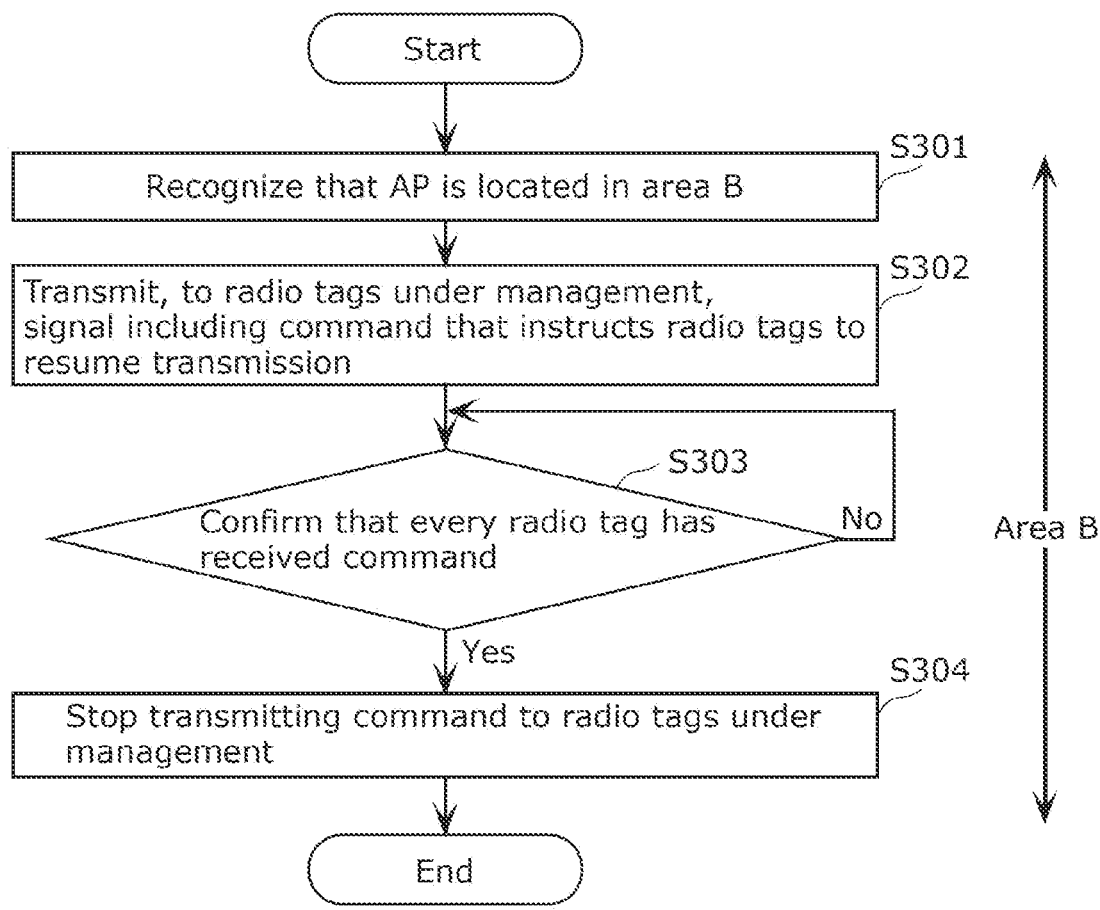
FIG. 18 is a flowchart illustrating one example of details of operation of an AP according to an embodiment.

FIG. 17 and FIG. 18 are flowcharts each illustrating one example of details of the operation of AP 20 according to the embodiment. With reference to FIG. 17 and FIG. 18, the following description will be given assuming that AP 20 and the plurality of radio tags 10 that are under the management of AP 20 are used in logistics, and radio tags 10 are moving from area A to area B where available radio frequencies are different from each other. FIG. 17 shows the operation of AP 20 in area A, and FIG. 18 shows the operation of AP 20 in area B.

First, as shown in FIG. 17, AP 20 recognizes (confirms) using the GPS or the like that AP 20 is located in area A (S201).

Next, AP 20 collects the entire ID information of radio tags 10 that are under the management (S202). For example, AP 20 is connected to a cellular wireless communication network in area A and thus collects and stores the ID information of the plurality of radio tags 10 that are under management.

Next, while being located in area A, AP 20 recognizes that radio tags 10 are to move to area B where the frequency (the radio frequency) to be used by radio tags 10 to transmit signals is different (S203). For example, by accessing a specific server or cloud storage via the wireless communication network and obtaining information of area B, which is a destination of radio tags 10, from the ID information of radio tags 10 that are under management, AP 20 recognizes that radio tags 10 under management are to move to area B.

Next, AP 20 transmits a signal including a command that instructs radio tags 10 under management to change the frequency and stop the transmission (S204). In the present embodiment, AP 20 broadcasts, to the plurality of radio tags 10, a signal including a command that instructs the radio tags to change the first frequency into the second frequency and stop the transmission, and thus transmits the signal including said command to radio tag 10 that is under management. Note that AP 20 may transmit a signal not including a command that instructs the radio tags to change the frequency, but including a command that instructs the radio tags to stop the transmission.

Next, when AP 20 confirms that every radio tag 10 has received the command (Yes in S205), AP 20 stops transmitting the command to the radio tags that are under management (S206). In the present embodiment, as a result of obtaining the ACK from every one of the plurality of radio tags 10 that are under management, AP 20 stops the broadcasting and thus stops transmitting the command to the radio tags that are under management. Note that when AP 20 fails to confirm in Step S205 that every radio tag 10 has received the command (No in S205), AP 20 performs Step S205 again and checks whether every radio tag 10 has received the command.

Next, the operation of AP 20 will be described with reference to FIG. 18.

First, as shown in FIG. 18, AP 20 recognizes (confirms) using the GPS or the like that AP 20 is located in area B (S301). When AP 20 moves from area A to area B together with radio tags 10 that are under management, AP 20 can recognize using the GPS or the like that AP 20 is located in area B and thus can recognize that AP 20 has entered area B. Note that when AP 20 does not move together with radio tags 10 that are under management, it is sufficient that by receiving input from a user, etc., of AP 20, AP 20 recognize (confirm) that radio tags 10 under management have entered area B. Furthermore, it is sufficient that AP 20 obtain, via the wireless communication network, the ID information of radio tags 10 under management that have been uploaded by AP 20 located in area A to the specific server or cloud storage.

Next, AP 20 transmits a signal including a command that instructs radio tags 10 under management to resume the transmission (S302). In the present embodiment, AP 20 broadcasts, at the frequency for area B to the plurality of radio tags 10 that are under management, a signal including a command that instructs the radio tags to start the transmission. Note that when AP 20 transmits a signal not including a command that instructs the radio tags to change the frequency, but including a command that instructs the radio tags to stop the transmission in FIG. 17, it is sufficient that AP 20 transmit a signal including a command that instructs the radio tags to change the frequency instead of the command that instructs the radio tags to resume the transmission.

Next, when AP 20 confirms that every radio tag 10 has received the command (Yes in S303), AP 20 stops transmitting the command to the radio tags that are under management (S304). In the present embodiment, as a result of obtaining the ACK from every one of the plurality of radio tags 10 that are under management, AP 20 stops the broadcasting and thus stops transmitting the command to the radio tags that are under management. Note that when AP 20 fails to confirm in Step S303 that every radio tag 10 has received the command (No in S303), AP 20 performs Step S303 again and checks whether every radio tag 10 has received the command.

[3 Advantageous Effects, Etc.]

As described above, radio tag 10 according to the present embodiment receives the command from the access point using the carrier-sense function before moving to an area where the frequency to be used is different, changes the frequency settings, and then stops the transmission to the access point. The operation of receiving commands continues with a new frequency, and when a transmission resumption instruction is received from the access point, the transmission to the access point resumes.

In this manner, according to the present embodiment, by merely changing control programs stored in a memory of an active radio tag without means for receiving data, it is possible to change the frequency of said radio tag using the carrier-sense function thereof. Furthermore, according to the present embodiment, using the carrier-sense function, the radio tag can simultaneously or alternately normal carrier sensing and carrier sensing that is used to interpret the command transmitted by the access point.

More specifically, the access point according to the present embodiment manages an active radio tag without means for receiving data and recognizes an area where said radio tag is currently located, and thus can transmit a command to said radio tag and cause a change in the frequency being used by said radio tag. Meanwhile, the radio tag according to the present embodiment, which is an active radio tag without means for receiving data, can nevertheless interpret, using the carrier-sense function, a command transmitted by the access point and thus can change the frequency being used by said radio tag.

The radio tag and the AP according to an aspect of the present disclosure have been described thus far based on the embodiment, etc., but the present disclosure is not limited to this embodiment. For example, other embodiments that can be realized by arbitrarily combining structural elements described in the present specification or by removing some structural elements may be embodiments of the present disclosure. Furthermore, variations obtainable through various changes to the above-described embodiment that can be conceived by a person having ordinary skill in the art without departing from the essence of the present disclosure, that is, the meaning of the recitations in the claims are included in the present disclosure.

Furthermore, the embodiments described below may also be included in one or more aspects of the present disclosure.

(1) Some of the structural elements included in the above-described AP may be a computer system configured of a microprocessor, a read only memory (ROM), a random access memory (RAM), a hard disk unit, a display unit, a keyboard, and a mouse, for example. A computer program is stored in the RAM or the hard disk unit. The microprocessor achieves its function by way of the microprocessor operating according to the computer program. Here, the computer program is configured of a combination of command codes indicating instructions to the computer in order to achieve a predetermined function.

(2) Some of the structural elements included in the above-described AP may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function by way of the microprocessor operating according to the computer program.

(3) Some of the structural elements included in the above-described AP may be configured from a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions by way of the microprocessor operating according to the computer program. The IC card and the module may be tamperproof.

(4) Furthermore, some of the structural elements included in the above-described AP may be the aforementioned computer program or a digital signal recorded on a computer-readable recording medium, such as a flexible disk, a hard disk, a compact disc read-only memory (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, in some of the structural elements included in the above-described AP, the computer program or the digital signal may be transmitted via an electrical communication line, a wireless or wired communication line, a network represented by the Internet, data broadcasting, or the like.

(5) The present disclosure may be the above-described methods. Furthermore, the present disclosure may be a computer program for implementing these methods using a computer or may be a digital signal of the computer program.

(6) Furthermore, the present disclosure may be a computer system including a microprocessor and a memory. The memory may have the computer program stored therein, and the microprocessor may operate according to the computer program.

(7) Moreover, by transferring the recording medium having the program or the digital signal recorded thereon or by transferring the program or the digital signal via the network or the like, the present disclosure may be implemented by a different independent computer system.

(8) The above embodiment and the above variations may be combined with each other.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure can be used for an active radio tag without means for receiving data and an access point that manages the active radio tag, for example.

The invention claimed is:

1. A communication method performed by one radio tag included in a plurality of radio tags of a communication system including an access point and the plurality of radio tags, the communication method comprising:
   setting a radio frequency for communicating bidirectionally between the one radio tag and the access point;
   performing, only at the radio frequency, carrier sensing at a predetermined time interval;
   transmitting first data including ID information to the access point when a signal transmitted by a radio tag different from the one radio tag to the access point is not detected during the performing of the carrier sensing and the one radio tag is not in a transmission stop state, the ID information being information for uniquely identifying the one radio tag;
   interpreting a command when a signal is detected during the performing of the carrier sensing and the signal is not a signal transmitted by a radio tag different from the one radio tag to the access point, the interpreting being performed under an assumption that the signal detected is a signal transmitted from the access point, the command being included in the signal transmitted from the access point; and
   changing the radio frequency, when the interpreting shows that the signal includes a command instructing changing of a frequency.

2. The communication method according to claim 1, wherein
   the transmitting includes
      transmitting second data to the access point when the interpreting shows that the signal includes a command instructing stopping of the transmission and changing of the frequency and when the signal transmitted by the radio tag different from the one radio tag to the access point is not detected during the performing of the carrier sensing, the second data being obtained by adding, to the first data, information indicating that the command has been received, in the changing, when the interpreting shows that the signal includes the command instructing stopping of the transmission and changing of the frequency, the radio frequency of the signal to be transmitted by the one radio tag is changed after the second data is transmitted, and the communication method further comprises:

controlling the one radio tag to stop only execution of the transmitting until the interpreting shows that the signal transmitted from the access point and detected during the performing of the carrier sensing includes a command instructing resuming of the transmission after the second data is transmitted in the transmitting.

3. The communication method according to claim 1, wherein the transmitting includes transmitting second data to the access point when the interpreting shows that the signal includes a command instructing stopping of the transmission and when the signal transmitted by the radio tag different from the one radio tag to the access point is not detected during the performing of the carrier sensing, the second data being obtained by adding, to the first data, information indicating that the command has been received, and the communication method further comprises:

controlling the one radio tag to stop only execution of the transmitting after the second data is transmitted in the transmitting.

4. The communication method according to claim 3, wherein in the changing, when the interpreting shows that the signal includes the command instructing changing of the frequency, the radio frequency of the signal to be transmitted by the one radio tag is changed, and the controlling includes resuming the execution of the transmitting when the radio frequency of the signal to be transmitted by the one radio tag is changed in the changing.

5. The communication method according to claim 2, wherein the information indicating that the command has been received is acknowledgement (ACK).

6. The communication method according to claim 1, wherein the performing of the carrier sensing includes:

calculating a strength of a signal received during the performing of the carrier sensing;

firstly determining, in a period in which a first averaged strength exceeds a first threshold value, that the signal transmitted by the radio tag different from the one radio tag to the access point is detected, the first averaged strength being obtained by averaging, in a first cycle, the strength calculated in the calculating; and secondly determining, by assessing a pattern, that a signal different from the signal transmitted by the radio tag different from the one radio tag to the access point is detected, the pattern being defined by a total number of times a second averaged strength exceeds a second threshold value and a total number of times the second averaged strength falls below the second threshold value, the second averaged strength being obtained by averaging, in a second cycle shorter than the first cycle, the strength calculated in the calculating.

7. The communication method according to claim 1, wherein in the performing of the carrier sensing, first carrier sensing and second carrier sensing are performed alternately, the first carrier sensing includes:

calculating a strength of a signal received during the performing of the carrier sensing; and firstly determining, in a period in which a first averaged strength exceeds a first threshold value, that the signal transmitted by the radio tag different from the one radio tag to the access point is detected, the first averaged strength being obtained by averaging, in a first cycle, the strength calculated in the calculating, and the second carrier sensing includes:

calculating a strength of a signal received during the performing of the carrier sensing; and secondly determining, by assessing a pattern, that a signal different from the signal transmitted by the radio tag different from the one radio tag to the access point is detected, the pattern being defined by a total number of times a second averaged strength exceeds a second threshold value and a total number of times the second averaged strength falls below the second threshold value, the second averaged strength being obtained by averaging, in a second cycle shorter than the first cycle, the strength calculated in the calculating.

8. The communication method according to claim 6, wherein in the interpreting, the command included in the signal transmitted from the access point is interpreted according to a combination of the total number of times the second averaged strength exceeds the second threshold value and the total number of times the second average strength falls below the second threshold value in the pattern assessed in the secondly determining.

9. One radio tag included in a plurality of radio tags of a communication system including an access point and the plurality of radio tags, the one radio tag comprising:

a carrier-sense unit that sets a radio frequency for communicating bidirectionally between the one radio tag and the access point, and performs, only at the radio frequency, carrier sensing at a predetermined time interval;

an output controller that transmits first data including ID information to the access point when a signal transmitted by a radio tag different from the one radio tag to the access point is not detected during the performing of the carrier sensing and the one radio tag is not in a transmission stop state, the ID information being information for uniquely identifying the one radio tag;

an interpreter that interprets a command when a signal is detected during the performing of the carrier sensing and the signal is not a signal transmitted by a radio tag different from the one radio tag to the access point, the interpreting being performed under an assumption that the signal detected is a signal transmitted from the access point, the command being included in the signal transmitted from the access point; and a frequency controller that changes the radio frequency, when the interpreter interprets that the command includes an instruction to change a frequency.

\* \* \* \* \*